US008864151B1

(12) United States Patent
Liu

(10) Patent No.: US 8,864,151 B1
(45) **Date of Patent: *Oct. 21, 2014**

(54) FOLDABLE WALKER APPARATUS

(71) Applicant: Evolution Technologies Inc., Port Coquitlam (CA)

(72) Inventor: Julian Liu, Port Moody (CA)

(73) Assignee: Evolution Technologies Inc., Port Coquitlam (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/893,043

(22) Filed: May 13, 2013

Related U.S. Application Data

(62) Division of application No. 12/916,199, filed on Oct. 29, 2010, now Pat. No. 8,573,613.

(51) Int. Cl.
*B62B 9/00* (2006.01)
*A61H 3/04* (2006.01)

(52) U.S. Cl.
CPC ........................................ *A61H 3/04* (2013.01)
USPC ...................................................... 280/87.021

(58) Field of Classification Search
CPC ........ B62B 9/00; B62B 7/08; B62B 2205/10; B62B 2205/104; B62B 19/02
USPC ......... 280/87.021, 47.34; 16/20, 21, 30, 18 A
See application file for complete search history.

(56) References Cited

U.S. PATENT DOCUMENTS

| | | | |
|---|---|---|---|
| 188,835 | A | 3/1877 | Allen |
| 291,351 | A | 1/1884 | Jackson |
| 2,356,793 | A | 8/1944 | O'Connor et al. |
| 2,631,655 | A | 3/1953 | Jannello |
| 2,656,881 | A | 10/1953 | Hamilton |
| 2,710,084 | A | 6/1955 | Braverman |
| 2,864,466 | A | 12/1958 | Taylor |

(Continued)

FOREIGN PATENT DOCUMENTS

| | | |
|---|---|---|
| CA | 2137650 | 6/1995 |
| CA | 2285305 | 10/1998 |

(Continued)

OTHER PUBLICATIONS

. . . showing the words "Jazz Brochure" besides a listing "May 1, 2008", which allegedly eventually links to "Dolomite Jazz Operating Instructions" shown in exhibit TT-7 . . . .
A web printout screen shot of http://web.archive.org/web/20080512005035/http:www.handicat.com/at-num-18827.html (exibits TT-16, 17) dated May 12, 2008.

(Continued)

*Primary Examiner* — Hau Phan
(74) *Attorney, Agent, or Firm* — Cameron IP

(57) ABSTRACT

There is provided a mounting assembly including a frame portion of the walker apparatus having a first bore and a second bore extending in a direction generally perpendicular to the first bore. The mounting assembly includes a shaft assembly rotatably connected to a wheel fork. The shaft assembly also is partially disposed within the first bore. The shaft assembly has a recess configured to align with the second bore. The mounting assembly includes a securing member threadably engageable with and at least partially disposed within the second bore. The securing member couples to the frame portion of the walker apparatus. The securing member has a tapered end that engages with portions of the shaft assembly surrounding the recess and is a set screw according to one aspect. The shaft assembly is a bolt according another aspect.

20 Claims, 28 Drawing Sheets

(56) References Cited

U.S. PATENT DOCUMENTS 2,866,495 A 12/1958 Diehl et al.
3,018,506 A 1/1962 Haydock
3,061,049 A 10/1962 Bramley
3,194,577 A 7/1965 Berlin
3,268,965 A 8/1966 Arthur
3,288,250 A 11/1966 Oja et al.
3,903,944 A 9/1975 Montgomery et al.
3,969,964 A 7/1976 George et al.
4,029,311 A 6/1977 Chanslor et al.
4,184,618 A 1/1980 Jones
4,261,561 A 4/1981 Ilon
4,371,183 A 2/1983 Dion
4,384,713 A 5/1983 Deutsch et al.
4,414,702 A 11/1983 Neumann
4,415,198 A 11/1983 Brearley
4,449,750 A 5/1984 Pultman
4,462,138 A 7/1984 Black
4,477,098 A 10/1984 Minnebraker
4,493,488 A 1/1985 Panaia et al.
4,494,271 A 1/1985 Perlin et al.
4,509,662 A 4/1985 Weiss
4,572,409 A 2/1986 Finnegan
4,659,099 A 4/1987 Malone
4,669,146 A 6/1987 Saito et al.
4,676,416 A 6/1987 Harmon
4,740,010 A 4/1988 Moskovitz
4,765,644 A 8/1988 Bell
4,800,911 A 1/1989 Endres et al.
4,800,991 A 1/1989 Miller
4,907,794 A 3/1990 Rose
4,907,839 A 3/1990 Rose et al.
4,913,452 A 4/1990 Zun
4,930,697 A 6/1990 Takahashi et al.
4,974,760 A 12/1990 Miller
5,012,963 A 5/1991 Rosenbaum
5,046,748 A 9/1991 Oat-Judge
5,103,530 A 4/1992 Andrisin et al.
5,109,569 A 5/1992 Shaw
5,158,313 A 10/1992 Becker
5,279,180 A 1/1994 Henriksson
5,293,965 A 3/1994 Nagano
5,294,027 A 3/1994 Plastina
5,348,336 A 9/1994 Fernie et al.
5,353,824 A 10/1994 Woods et al.
5,356,237 A 10/1994 Sung
5,465,986 A 11/1995 MacRae
5,482,189 A 1/1996 Dentler et al.
5,513,789 A 5/1996 Woods et al.
5,527,096 A 6/1996 Shimer
5,531,238 A 7/1996 Azzarelli et al.
5,593,461 A 1/1997 Reppert et al.
5,594,974 A 1/1997 Wattron et al.
5,605,345 A 2/1997 Erfurth et al.
5,639,052 A 6/1997 Sauve
5,662,342 A 9/1997 Basharat
5,687,984 A 11/1997 Samuel
5,772,234 A 6/1998 Luo
5,813,582 A 9/1998 Wright
5,865,065 A 2/1999 Chiu
5,896,779 A 4/1999 Bierstecker et al.
5,901,891 A 5/1999 Douglass
5,927,441 A 7/1999 Luo
5,953,962 A 9/1999 Hewson
5,954,161 A 9/1999 Lee
6,032,765 A 3/2000 Hsi-Chia
6,047,439 A 4/2000 Stearn
6,079,290 A 6/2000 Li
6,098,487 A 8/2000 Chien
6,099,002 A 8/2000 Uchiyama
6,135,475 A 10/2000 Brown et al.
6,142,526 A 11/2000 Katz
6,192,772 B1 2/2001 Huang
6,202,502 B1 3/2001 Chung-Che
6,216,825 B1 4/2001 Hung
6,283,484 B1 9/2001 Malmstrom
6,296,261 B1 10/2001 deGoma
6,296,263 B1 10/2001 Schultz et al.
6,311,708 B1 11/2001 Howle
6,318,392 B1 11/2001 Chen
6,338,355 B1 1/2002 Cheng
6,338,493 B1 1/2002 Wohlgemuth et al.
6,354,619 B1 3/2002 Kim
6,364,070 B1 4/2002 Chen
6,371,142 B1 4/2002 Battiston
6,378,883 B1 4/2002 Epstein
6,386,575 B1 5/2002 Turner
6,409,196 B1 6/2002 McFarland
6,442,797 B1 9/2002 Yang et al.
6,491,318 B1 12/2002 Galt et al.
6,494,469 B1 12/2002 Hara et al.
6,502,280 B2 1/2003 Looker
6,527,136 B1 3/2003 Sabounjian
6,647,825 B1 11/2003 Lin
6,651,994 B2 11/2003 Hallgrimsson et al.
6,659,478 B2 12/2003 Hallgrimsson et al.
6,688,633 B2 2/2004 van't Schip
6,755,285 B1 6/2004 Wu
6,769,701 B1 8/2004 Clausen
6,837,503 B2 1/2005 Chen et al.
D501,432 S 2/2005 Møller
6,877,519 B2 4/2005 Fink
6,889,998 B2 5/2005 Sterns et al.
7,052,030 B2 5/2006 Serhan
7,090,239 B2 8/2006 Yoshie et al.
7,108,004 B2 9/2006 Cowie et al.
7,211,744 B2 5/2007 Jorgenson
7,219,906 B2 5/2007 Hallgrimsson et al.
7,231,689 B2 6/2007 Schieber et al.
7,306,246 B2 12/2007 Gale
7,353,566 B2 4/2008 Schieber et al.
7,383,611 B2 6/2008 Foster
7,384,058 B2 6/2008 Munsey et al.
7,410,179 B2 8/2008 Lönkvist
7,422,550 B1 9/2008 Pinero et al.
7,494,138 B2 2/2009 Graham
7,500,689 B2 3/2009 Pasternak et al.
7,559,560 B2 7/2009 Li et al.
7,775,547 B2 8/2010 Dotsey et al.
7,828,305 B2 11/2010 Meyers et al.
7,926,834 B2 4/2011 Willis
7,984,724 B1 7/2011 Eberte
8,002,363 B2 8/2011 Cheng
8,251,391 B2 8/2012 Kohler et al.
8,505,936 B2 * 8/2013 Liu .......................... 280/87.021
8,511,694 B2 8/2013 Bradshaw et al.
8,517,399 B2 8/2013 Liu
8,573,613 B2 * 11/2013 Liu .......................... 280/87.021
8,602,424 B2 12/2013 Liu
2002/0079663 A1 6/2002 Hallgrimsson et al.
2003/0010368 A1 1/2003 MacKinnon
2003/0226584 A1 12/2003 Serhan
2004/0111830 A1 6/2004 Cooper et al.
2005/0001398 A1 1/2005 Serhan
2005/0057021 A1 3/2005 Miyoshl
2005/0121481 A1 6/2005 Chlu
2005/0156395 A1 7/2005 Bohn
2005/0156404 A1 7/2005 Lauren et al.
2005/0211285 A1 9/2005 Cowie et al.
2007/0170699 A1 7/2007 Li et al.
2007/0199586 A1 8/2007 Cheng
2007/0227570 A1 10/2007 Gale et al.
2007/0235067 A1 10/2007 Gale et al.
2007/0267054 A1 11/2007 Meyers et al.
2007/0267453 A1 11/2007 Carroll
2007/0278271 A1 12/2007 Koren
2007/0278768 A1 12/2007 Lynam
2008/0079230 A1 4/2008 Graham
2008/0111349 A1 5/2008 Willis
2008/0121258 A1 5/2008 Lin
2008/0129016 A1 6/2008 Willis
2008/0174084 A1 7/2008 Gee
2009/0033052 A1 2/2009 Bradshaw et al.

(56) References Cited

U.S. PATENT DOCUMENTS

| | | | |
|---|---|---|---|
| 2009/0206578 A1 | 8/2009 | Pizmony et al. |
| 2010/0083994 A1 | 4/2010 | Liu |

FOREIGN PATENT DOCUMENTS

| | | | |
|---|---|---|---|
| CA | 2352801 | | 6/2000 |
| CA | 2329485 | | 6/2002 |
| CA | 2513558 | | 9/2004 |
| CA | 2492392 | | 9/2005 |
| CA | 2640909 | | 4/2010 |
| CA | 2722599 | | 4/2010 |
| CA | 2724045 | | 4/2010 |
| CA | 2724089 | | 4/2010 |
| CA | 2743046 | | 4/2010 |
| DE | 1396227 | | 6/1975 |
| DE | 4328875 | | 2/1995 |
| DE | 29818710 | | 10/1999 |
| DE | 102010031954 | | 1/2012 |
| EP | 1092411 | | 4/2001 |
| EP | 2090276 | | 8/2009 |
| GB | 23483 | | 5/1913 |
| GB | 365901 | | 1/1932 |
| GB | 984025 | | 2/1965 |
| GB | 2180508 | | 4/1987 |
| JP | 09123915 | A | 5/1997 |
| JP | 10-291401 | | 11/1998 |
| NL | 1022512 | | 8/2004 |
| WO | WO 92/06661 | | 4/1992 |
| WO | WO 98/51557 | | 11/1998 |
| WO | WO 02/22070 | | 3/2002 |
| WO | 2008019454 | | 2/2008 |
| WO | 2010/040198 | | 4/2010 |
| WO | WO 2010/040198 | | 4/2010 |

OTHER PUBLICATIONS

A web printout screen shot of http://web.archive.org/web/20050512005035/http://www.handicat.com/at-num-18827.html (translated) (exhibit TT-18) dated May 12, 2008.
. . . showing the words "TUV Certificate 2007—Jazz" (exhibit T-23).
"Pruefpotokoll/test protocol Rollatoren Jul. 2005", signed on Oct. 30, 2007 (exhibit TT-25), Hannover, Germany.
A web printout screen shot of http://web.archive.org/web/20080214151414/http://www.dolomite.biz/ (exhibit TT-32) dated Feb. 14, 2008.
US 7,364,173, 04/2008, Meyers et al. (withdrawn).
A web screen shot prinout from doclibrary.invacare.fr . . . (?) dated Aug. 6, 2013, in which adjacent to the heading "Dolomite Jazz", a "Jazz Sales Brochure" is listed as . . . having a "start date of validity" of May 1, 2008, and in which a "Jazz spare parts list" is listed as having a "start date of validity" of May 1, 2008.
Two web screen shot prinouts from doclibrary.invacare.fr . . . (?) dated Aug. 6, 2013, in which adjacent to a "Dolomite Jazz" heading, "2007" is set out by a "TUV certificate".
Two web screen shot prinouts from handicat.com/classif4-num-03-09-06.html, dated Aug. 6, 2013, in which adjacent to a "Dolomite Jazz" heading, the words "Crée le . . . May 7, 2008—Modifiée: Jul. 24, 2013", which may mean "Created on May 7, 2008—Modified: Jul. 27, 2013".
A web screen shot printout of: web.archive.org/web/20080508194602/http://www.dolomite.biz/, dated May 8, 2008.
A web printout screen shot of http://web.archive.org/web/20080919040758/http://www.dolomite.biz/dolomite/dolomite-jazz.php (exhibit TT-34) dated Feb. 14, 2008.
A web printout screen shot of http://web.archive.org/web/20080608193327/http://www.dolomite.biz/dolomite/products.php (exhibit TT-33) dated Feb. 14, 2008.

* cited by examiner

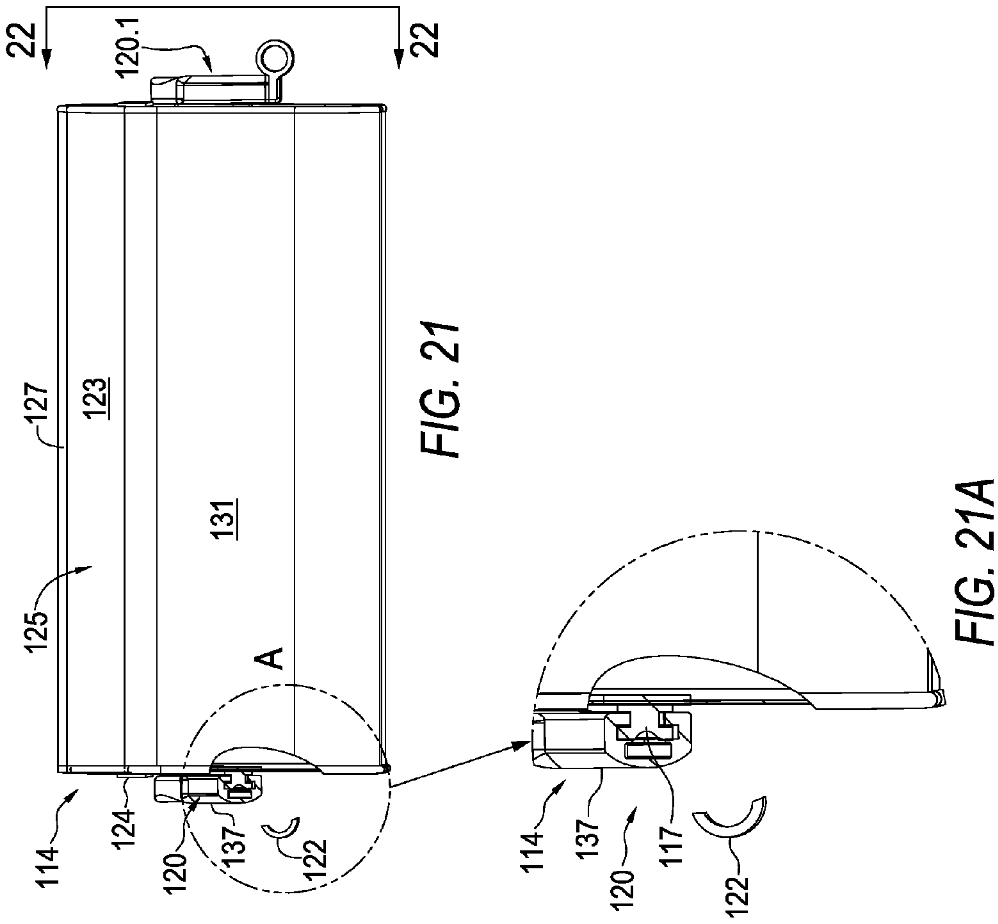
FIG. 21
FIG. 21A
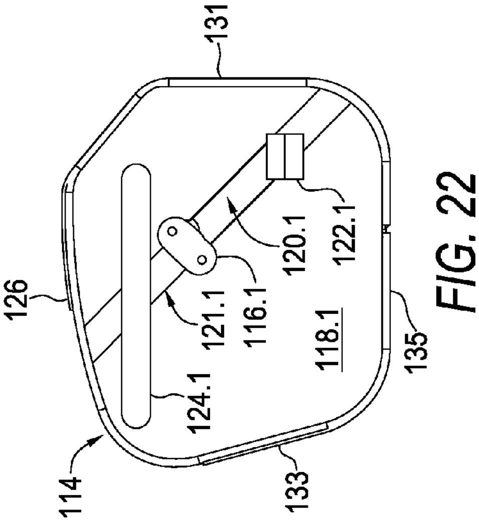
FIG. 22

FOLDABLE WALKER APPARATUS

CROSS REFERENCE TO RELATED APPLICATION

This application is a divisional of U.S. patent application Ser. No. 12/916,199 filed in the United States Patent and Trademark Office on Oct. 29, 2010, the disclosure of which is incorporated herein by reference and priority to which is claimed.

BACKGROUND OF THE INVENTION

1. Field of the Invention

The present invention relates to a foldable walker apparatus. More particularly, it relates to a foldable walker apparatus having a variety of optimized features relating to its folding mechanism, braking pad mechanism and brake housing, brake rod assembly, frame shape, collapsible basket, front wheel assembly and related mounting assembly.

2. Description of the Related Art

It is known to have foldable walkers. However, much of the prior art discloses walkers that require many parts and this may lead to additional manufacturing costs. On the other hand, some walkers have fewer parts but may suffer from a lack of robustness and rigidity, particularly in the lateral direction. This may lead to a compromise in the safety of such devices. Some walkers in their folded states remain bulky and difficult to manage. Still further known walkers suffer from having many parts that may tangle with one's clothing.

There are a great variety of frame shapes for walkers. In order to accommodate the variety of body shapes and circumstances that a user of walkers may encounter, a strong frame is needed. This has led to frames that have many parts, which may lead to further manufacturing costs. Alternatively, this has led to frames that are square or rounded-square in profile which are thicker and/or made of heavy duty metals. Such features may lead to a heavier, less manageable and therefore less enjoyable walker.

Many foldable walkers include baskets. However often times these baskets need to be removed before the foldable walkers may be folded. Alternatively, many of these baskets require the foldable walker to fold from front to back. This may compromise the strength and rigidity of the frame of the foldable walker. Also, many of the baskets for walkers require many parts. This may act to increase manufacturing costs.

A variety of walkers have a housing over the brake pad mechanisms. However, often times this housing only partially extends over the brake pad. Even if the brake pad is covered by a housing, often the connecting and adjusting means for adjusting the brake pad protrudes outwards or is exposed for the user to adjust. As a result, some walkers of the prior art have brake pad mechanisms that are more prone to getting entangled with the user of the walker, which may lead to a great inconvenience and a safety concern for the user. Moreover, such walkers are more prone to breaking, and wear and tear, including damage such as thread-stripping of the connecting and adjusting means for the brake pad. This may lead to the considerable inconvenience, and extra expense to the user, or a premature need to replace the brake pad mechanism. It may also lead to a further compromised safety to the user if as a result the walker no longer brakes.

The use of a brake rod for walkers is known. Brake rods provide the advantage of enabling the walker's height to be adjusted without affecting brake cables disposed within the walker's telescoping tubes. However, some walkers require the two separate steps of 1) adjusting and fixing the height of the telescoping tubes through thumb screws and 2) fixing the brake rod to function accordingly. This is time consuming, requiring additional parts and thus manufacturing costs. It also may require a significant degree of dexterity which may therefore be challenging and therefore frustrating for the user of the walker. Some walkers combine the fixing of the height of the telescoping tubes with the fixing of the brake rods. However such walkers require that the length of the telescoping tubes be first fixed by the user in order to enable the brake rods to function. Therefore, if the user does not have the dexterity to fix the height of the telescoping tubes, or if the fixing mechanism for the telescoping tubes malfunctions or no longer works through damage or wear and tear, such as a stripping of the thumb screw, this means that the brake rod cannot be fixed and the braking function of the walker will not work. This may result in a walker braking mechanism that is less robust and less safe.

Some mounting assemblies of the prior art, on the one hand, are configured for connecting front wheel assemblies to walker apparatuses with rotating shafts that may dislodge or slip when the walker apparatuses are used on carpets and the like, as well as through wear and tear and/or manufacturing defects and imperfections. When this occurs, the walker apparatus' motion and operation may be inhibited. Shaft assembly slippage is annoying to a user and may hinder the user's ability to operate the walker apparatus. This problem is exasperated by users who may be elderly and/or who may already have limited motor skills and manoeuvrability.

Some walker apparatuses, on the other hand, provide mounting assemblies for front wheel assemblies where the mounting assemblies are relatively complicated, requiring relatively many parts. Such mounting assemblies and walker apparatuses may thus require a relatively greater amount of manufacturing and installation time, all of which may lead to increased costs.

Mounting assemblies for front wheel forks are typically made with plastic parts and rotate by means of bearings. Bearings have play and this renders it difficult to maintain a shaft aligned on a true axis by way of a single bearing. Some devices of the prior art use two spaced-apart bearings to keep the fork "true". With two bearings, play is reduced. However the use of two bearings may lead to further increased costs and may also add an extra burden to manufacturing accuracy.

There is accordingly a need for an improved walker apparatus that overcomes the above set out disadvantages in a cost-effective manner.

BRIEF SUMMARY OF INVENTION

An object of the present invention is to provide an improved walker apparatus, and more specifically an improved mounting assembly for front wheel assemblies, which overcomes the above disadvantages.

More particularly, the present invention provides a mounting assembly for fixedly mounting a pivotable wheel fork to a walker apparatus. The mounting assembly includes a frame portion of the walker apparatus. The mounting assembly includes a first one of the wheel fork and the frame portion of the walker apparatus having both a first bore and a second bore extending in a direction generally perpendicular to the first bore. The mounting assembly includes a shaft assembly rotatably connected to a second one of the wheel fork and the frame portion of the walker apparatus. The shaft assembly also is partially disposed within the first bore. The shaft assembly has a recess configured to align with the second bore. The mounting assembly includes a set screw threadably engageable with and at least partially disposed within the second bore. The set screw couples to the first one of the wheel fork and the frame portion of the walker apparatus. The set screw has a tapered end that engages with portions of the shaft assembly surrounding the recess. The shaft assembly is fixedly mounted to the first one of the wheel fork and the frame portion of the walker apparatus thereby.

According to another aspect, there is provided a mounting assembly for fixedly mounting a pivotable wheel fork to a walker apparatus. The assembly includes a frame portion of the walker apparatus. A first one of the wheel fork and the frame portion of the walker apparatus has both a first bore and a second bore extending in a direction generally perpendicular to the first bore. The assembly includes a bolt rotatably connected to a second one of the wheel fork and the frame portion of the walker apparatus. The assembly is also partially disposed within the first bore. The bolt has a recess configured to align with the second bore. The assembly includes a securing member at least partially disposed within the second bore. The securing member couples to the first one of the wheel fork and the frame portion of the walker apparatus. The securing member engages with portions of the bolt surrounding the recess. The bolt is fixedly mounted to the first one of the wheel fork and the frame portion of the walker apparatus thereby.

According to a further aspect, there is provided a mounting assembly for mounting a wheel fork to a frame portion of a walker apparatus. The wheel fork has a bore. The mounting assembly includes a shaft assembly coupled to the frame portion and at least partially disposed within the bore of the wheel fork. The mounting assembly includes an alignment member at least partially disposed within the bore of the wheel fork. The alignment member has a first portion shaped to extend around the shaft assembly and a resilient second portion configured to abut against portions of the wheel fork surrounding the bore. The alignment member thereby rotatably aligns and supports pivoting of the wheel fork about the shaft.

BRIEF DESCRIPTION OF DRAWINGS

The invention will be more readily understood from the following description of preferred embodiments thereof given, by way of example only, with reference to the accompanying drawings, in which:

FIG. 21 is a rear elevation view of the collapsible basket of FIG. 19;

FIG. 21A is an enlarged view of FIG. 21 illustrating a connection bracket and an insert shaped to be received by the connection bracket for thereby mounting the collapsible basket;

FIG. 22 is side elevation view of the collapsible basket shown along lines 22-22 of FIG. 21;

DESCRIPTION OF THE PREFERRED EMBODIMENTS

Figure 1:
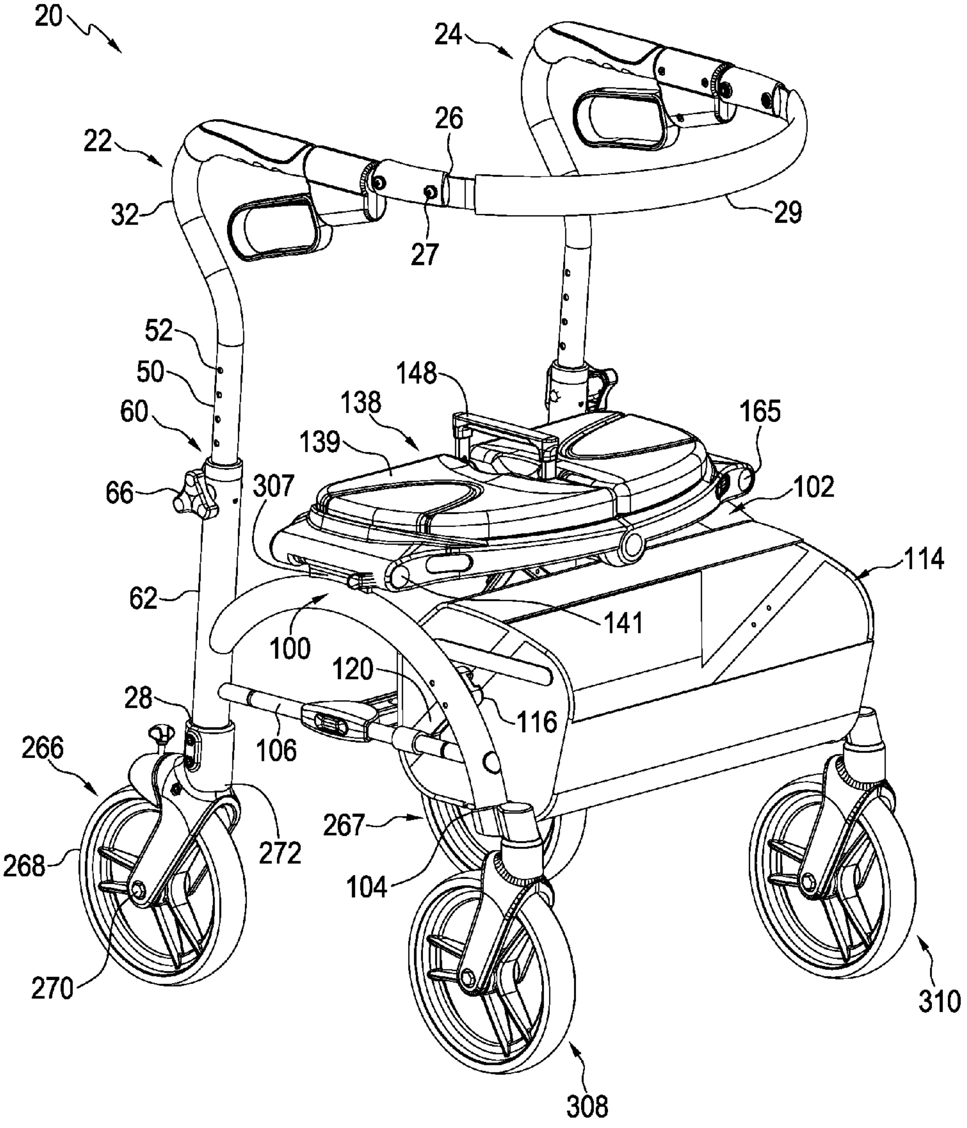
FIG. 1 is a top, front isometric view of a walker apparatus, according to one embodiment of the invention.
Figure 2:
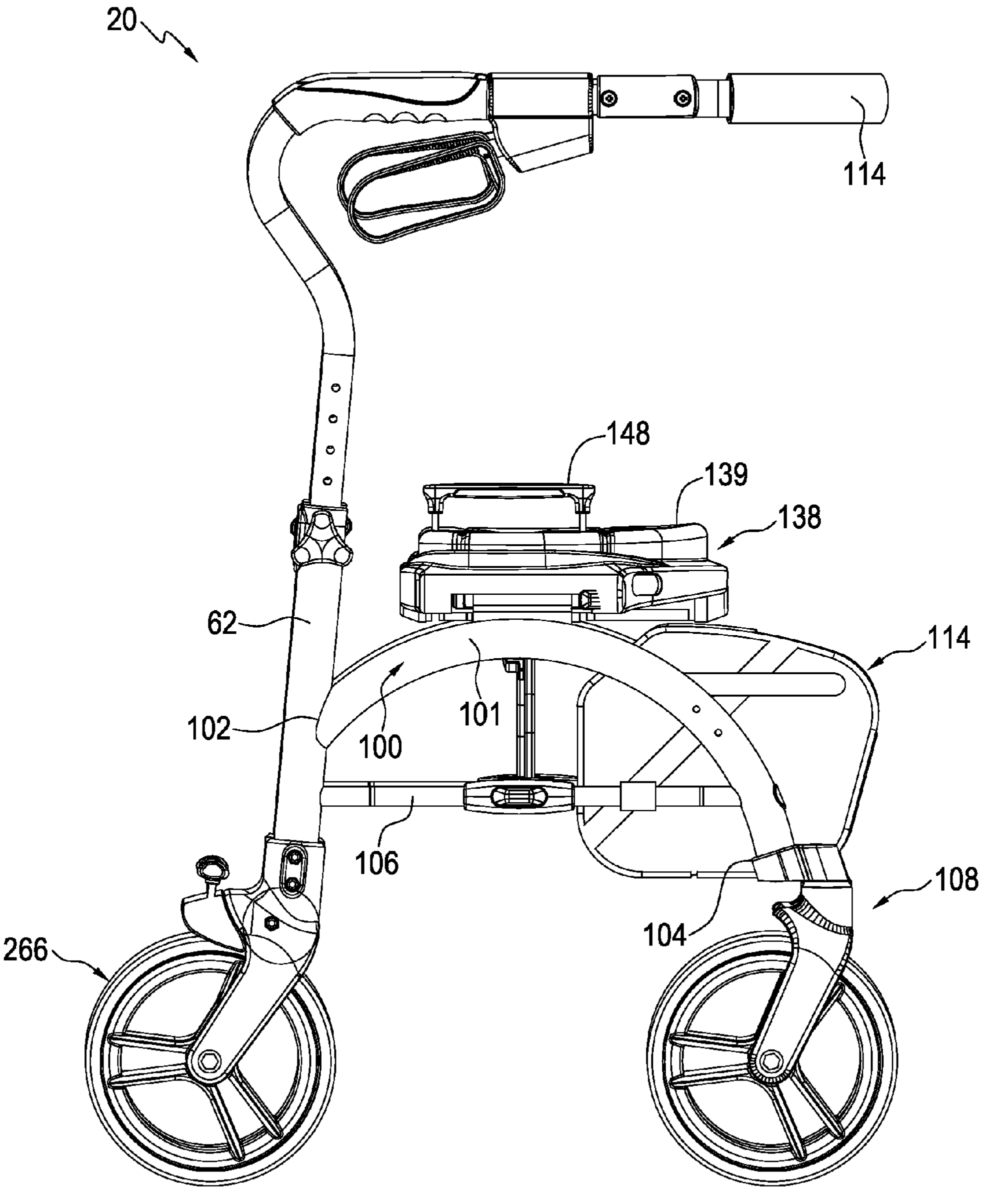
FIG. 2 is a side elevation view of the walker apparatus of FIG. 1.

Referring to the drawings and first to FIGS. 1 to 4, there is provided a walker apparatus in this example a foldable walker apparatus 20. As shown in FIG. 1, the walker apparatus 20 includes a pair of upright, spaced-apart elongate members or outer frame members 22 and 24. The outer frame member 22 has an upper end 26 and a lower end 28 opposite the upper end. A screw 27 located adjacent to the upper end connects to a backrest member 29. The same applies for outer frame member 24 and the backrest member 29 thereby connects the outer frame members 22 and 24 together at their upper ends. Each of the outer frame members has substantially the same parts and performs substantially the same functions and therefore only outer frame member 22 will be discussed in detail.

Figure 5:
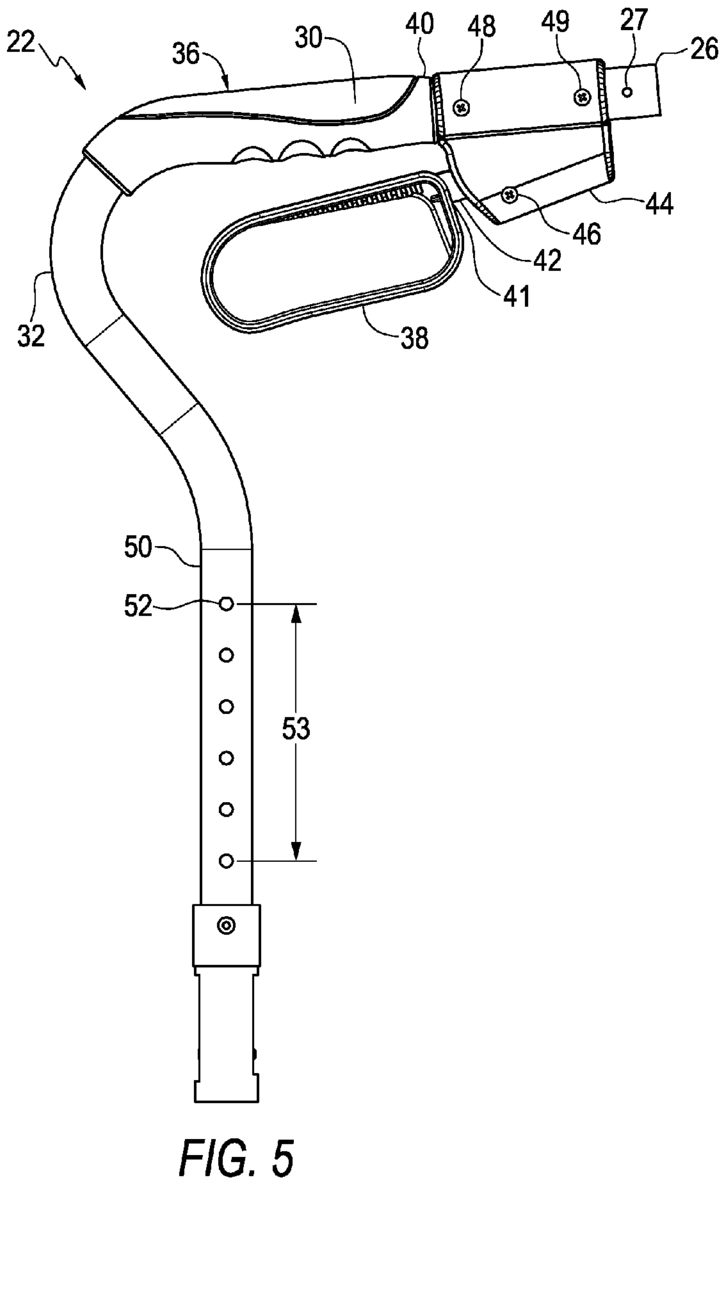
FIG. 5 is a side elevation view of part of an outer frame member including a handle bar assembly, according to one embodiment of the invention.

FIG. 5 shows part of the outer frame member 22 with a handle bar assembly 36 mounted on a straight portion 40. The handle bar assembly 36 includes a grip pad 30 extending along the straight portion 40. The handle bar assembly 36 includes a handle bar housing 44 comprised of two halves secured together and secured to the straight portion 40 via screws 46, 48 and 49. The handle bar assembly 36 also includes a first handle lever 42 having a first end 41 with an actuator, in this example a gripping handle 38, extending therefrom. The handle bar assembly 36 is illustrated in greater detail in FIGS. 7 to 9 where one half of the handle bar housing 44 is partially removed to show an interior 45 of the handle bar housing 44.

Figure 7:
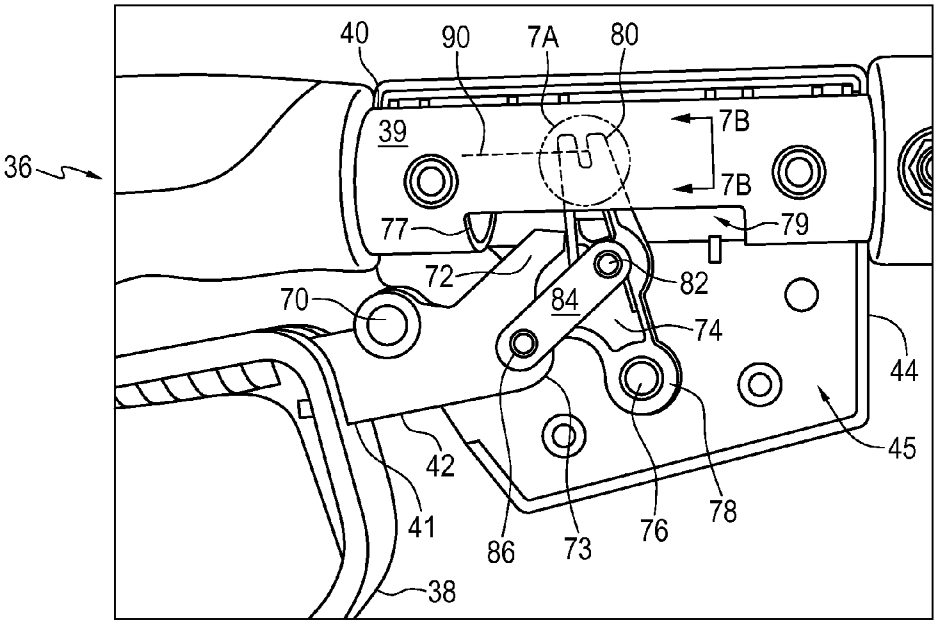
FIG. 7 is a partial, side elevation view of the interior of the handle bar assembly including a handle in a non-actuated mode.

Referring first to FIG. 7, this shows the handle bar assembly 36 in an non-actuated mode. The first handle lever 42 is pivotally mounted via pivot 70 to the handle bar housing 44. The first handle lever 42 has a second end 72 opposite the first end 41. The first handle lever 42 includes a projection 73 interposed between the first end 41 and the second end 72. The second end 72 is positioned to be engageable with a second handle lever 74.

The second handle lever 74 is pivotally mounted to the handle bar housing 44 via pivot 76 at a first end 78 thereof. The second handle lever 74 has a second end 80 opposite the first end 78. A link 84 pivotally connects together the first handle lever 42 to the second handle lever 74 via pivot 86 which is between ends 41 and 72 of the first handle lever, and pivot 82 which is between ends 78 and 80 of the second handle lever. The first handle lever 42, the second handle lever 74 and the link 84 may collectively be referred to as an actuation means for actuating a connection member or brake wire 90 when the gripping handle 38 is squeezed. As shown in FIG. 7C in combination with FIG. 7, the second handle lever 74 has a projection 75, between the first end 78 and the second end 80, which extends towards the projection 73 of the first handle lever 42. These are shown in FIG. 7C with the link 84 removed. Referring FIG. 7, the second end 80 of the second handle lever 74 extends within and is moveable within a recess 79 of a body 39 of the straight portion 40 of the outer frame member. An edge 77 is interposed between the body 39 and recess 79.

Figure 7A:
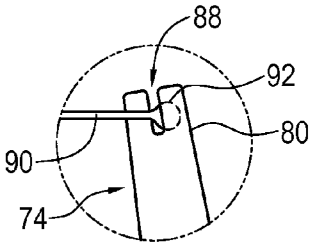
FIG. 7A is an enlarged up, side elevation view of a lever and brake wire connected thereto for the handle bar assembly of FIG. 7.
Figure 7B:
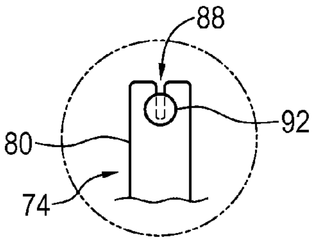
FIG. 7B is an enlarged view along lines 7B-7B of FIG. 7 illustrating the lever and brake wire connected thereto.
Figure 7C:
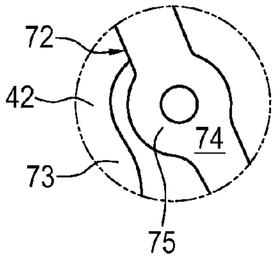
FIG. 7C is an enlarged, partial view of FIG. 7 showing a projection from a first handle lever and an adjacent projection from a second handle lever.

Referring to FIGS. 7A and 7B which show partially within the recess 79, the second end 80 includes a slot 88. The brake wire 90 is connected to the second handle lever 74 through a nipple 92 extending from the brake wire 90 and that engages with the slot 88. The nipple 92 prevents the brake wire 90 from being released from the second end 80 of the second handle lever 74.

Figure 8:
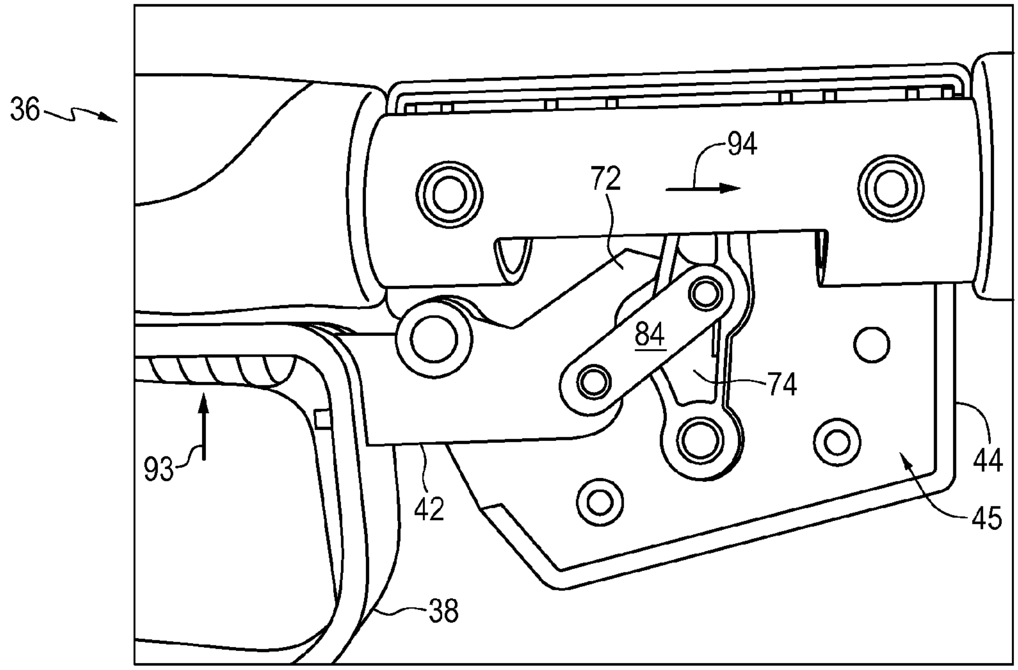
FIG. 8 is a partial, side elevation view similar to FIG. 7 with the handle in an actuated brake mode.

The handle bar assembly 36 may be positioned in an actuated, braking mode as shown in FIG. 8. When the gripping handle 38 is actuated or pulled upwards from the perspective of FIG. 8 as indicated by arrow 93, this causes the second end 72 of the first handle lever 42 to forceably abut against and push the second handle lever 74 to the right, from the perspective of FIG. 8 as indicated by arrow 94. This thereby causes the brake wire 90 to be actuated.

Figure 9:
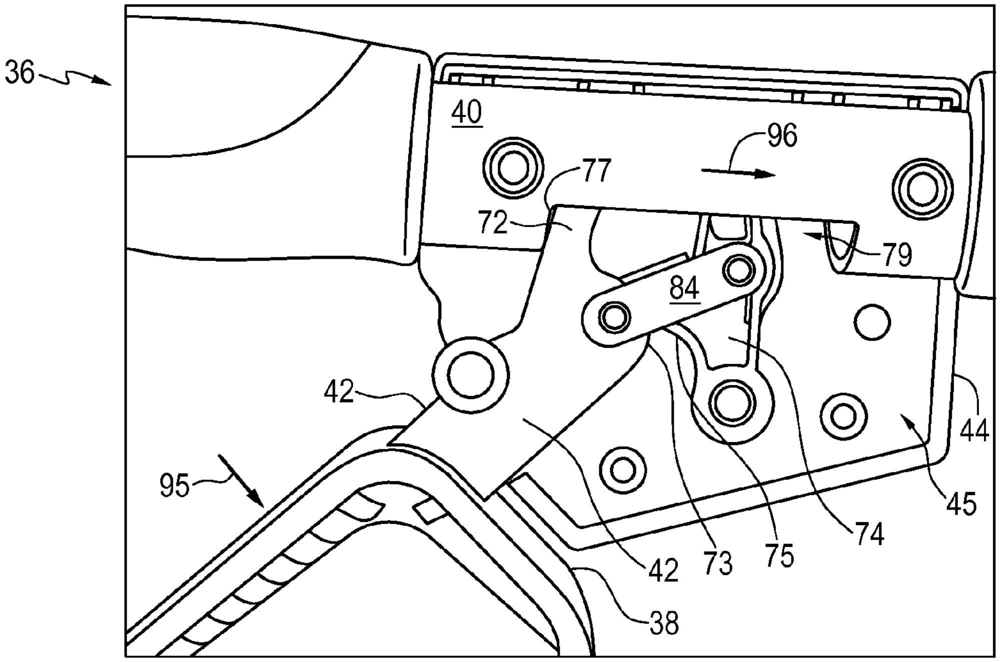
FIG. 9 is a partial, side elevation view similar to FIG. 7 with the handle is an actuated park mode.

The handle bar assembly 36 may be positioned in an actuated, parking mode as shown in FIG. 9. When the gripping handle 38 is actuated or pushed downward from the perspective of FIG. 9, this causes the first end 72 of the first handle lever 42 to move within the recess 79 and abut against edge 77 of the straight portion 40 which is adjacent to the recess 79. Also, the projection 73 of the first handle lever 42 is caused to forcibly abut with the projection 75 of the second handle lever 74. The first handle lever 42 is thereby held in place by being wedged between the edge 77 of the straight portion 40 and the projection 75. The abutment of the projection 73 against projection 75 thereby causes the second handle lever 74 to move to the right from the perspective of FIG. 9 as indicated by arrow 96 and thereby actuate the brake wire 90.

Figure 6:
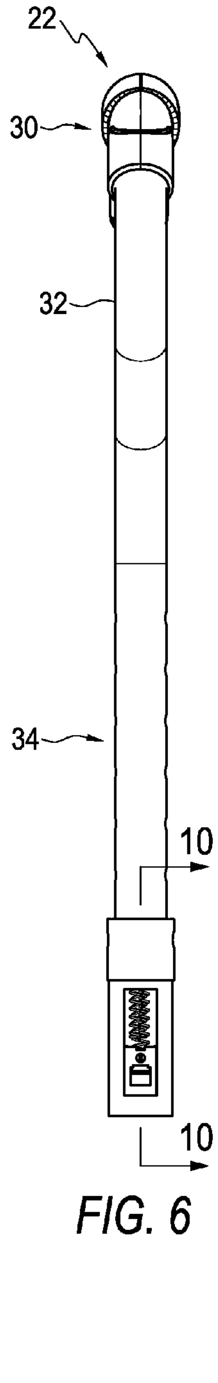
FIG. 6 is a rear elevation view of the part of the outer frame member of FIG. 5.

Referring back to FIGS. 5 and 6, the frame member 22 has a bend 32 extending from the straight portion 40. Referring in combination to FIGS. 1 and 5, the bend 32 extends to telescoping tubes 60 which include inner tube 50 and outer tube 62 shaped to receive the inner tube 50. The straight portion 40, the bend 32 and telescoping tubes 60 together provide a rounded L-shape for the outer frame member 22. Tube 50 has a plurality of spaced-apart apertures 52 which define an adjustment range 53, as shown in FIG. 5. A means for locking the telescoping tubes together, in this example a thumb screw 66, shown in FIG. 1, may be inserted through one of said apertures to fixedly adjust the height of the telescoping tubes 60, as is well known to those skilled in the art. This thereby enables the height of the walker apparatus to be adjusted to provide an optimized height for the user.

Figure 10:
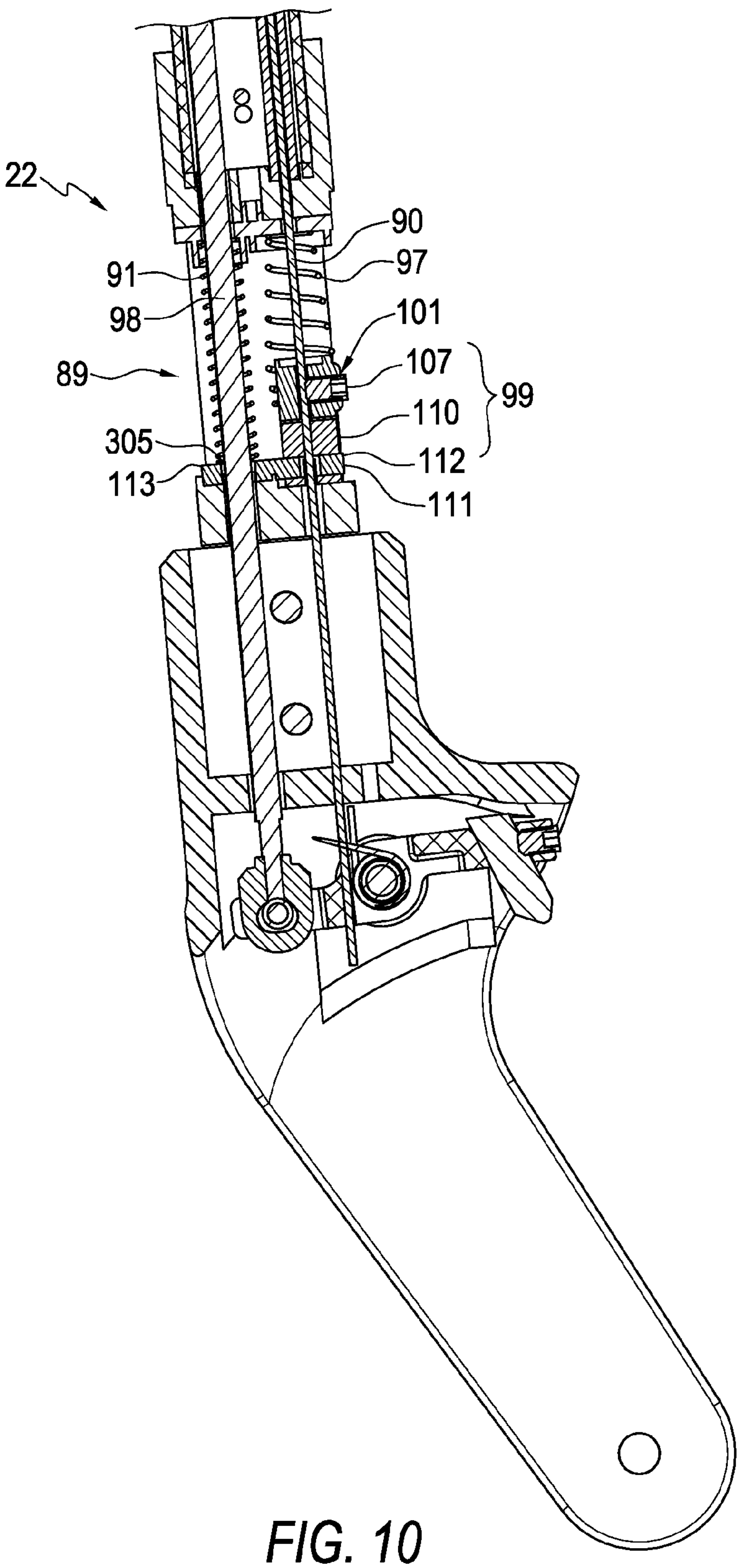
FIG. 10 is a side partial view of the outer frame member in section in part along lines 10-10 of FIG. 6 to illustrate a brake rod assembly according to one embodiment of the invention.

FIG. 10 shows part of the outer frame member 22 and more specifically the inner tube 50 partially in section to reveal a brake rod assembly 89. The brake rod assembly 89 includes a brake rod 98 which extends within inner tube 50 of FIG. 5. The brake rod 98 in this example has a hexagonal cross-section. A coil spring 91 extends about the brake rod 98. The inner tube 50 is slidably engageable with the brake rod 98 along a distance equal to the adjustment range 53 of FIG. 5. A gripping member 99 is adjacent to and slidably engageable with the brake rod 98 along a distance equal to the adjustment range 53 of FIG. 5. The gripping member 99 in this example includes a clamp 101 that engages with the brake wire 90 via a set screw 101. A coil spring 97 wraps around brake wire 90 above the clamp 101 from the perspective of FIG. 10. The coil spring 91 and the coil spring 97 bias the gripping member 99 downwards, from the perspective of FIG. 10, towards a non-actuated mode. The gripping member 99 also includes a block 110 and plate, in this example a metal plate 112, that both also engage with the brake wire 90 near a first end 111 of the metal plate 112. The metal plate 112 has an aperture 305 near a second end 113 of the metal plate 112 opposite the first end 111. The aperture 305 in this example has a hexagonal shape. The brake rod 98 passes through the aperture 305. The metal plate 112 is slidably engageable with the brake rod 98.

Figure 11:
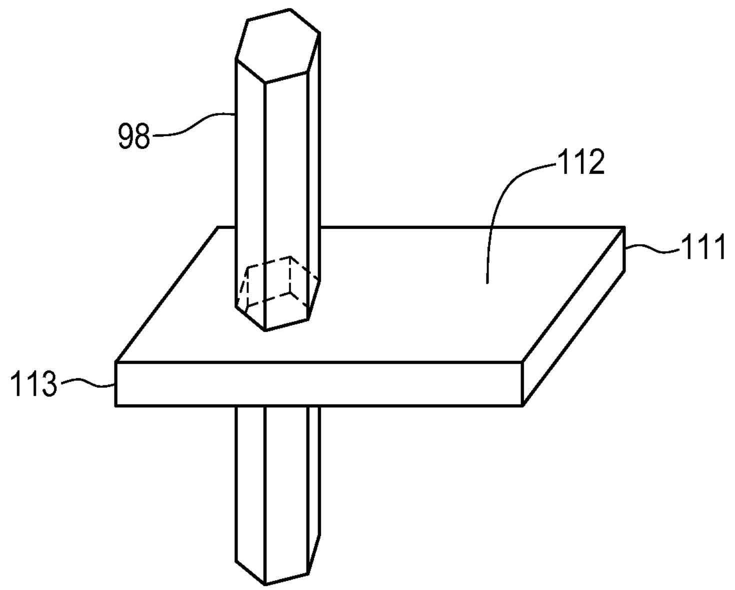
FIG. 11 is an enlarged, partial elevation view of the brake rod with a gripping member according to one embodiment of the invention slidably connected thereto in a non-actuated mode.
Figure 12:
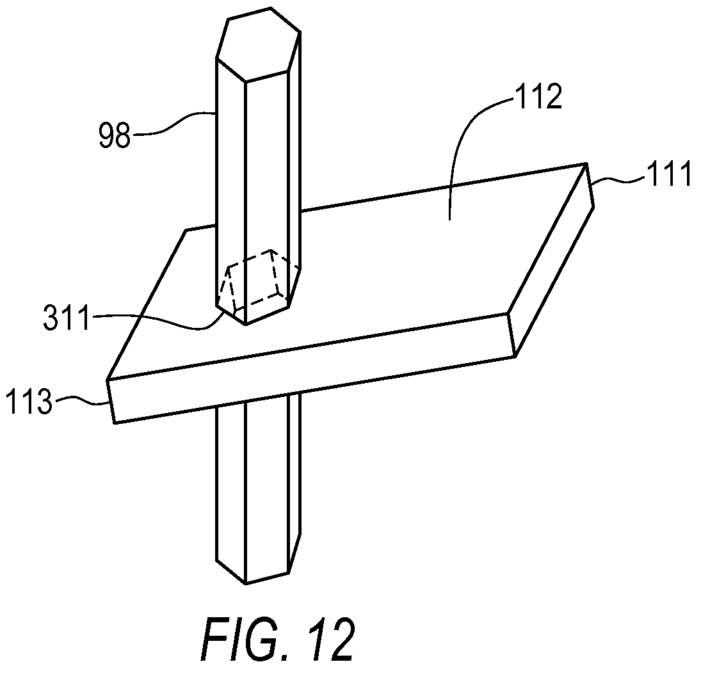
FIG. 12 is an enlarged, partial elevation view similar to FIG. 11 with the gripping member engaging the brake rod in an actuated mode.

FIG. 11 shows the metal plate 112 and the brake rod 98 of FIG. 10 in isolation. The metal plate 112 slidably receives the brake rod 98 in a non-actuated mode. The brake wire 90 is operatively connected to the metal plate 112 adjacent to the first end 111 as seen in FIG. 10. When the brake wire 90 is actuated or pulled upwards from the perspective of FIGS. 10 and 11, the first end 111 of the metal plate moves upward as indicated by FIG. 12. The plate is thereby caused to tilt, with the aperture 305 abutting and engaging the brake rod 98. The metal plate 112 thereby is able to grip the brake rod 98. The brake wire 90 continues to be pulled upwards when actuated and this causes the metal plate, and in turn, the brake rod 98, to move upwards in unison with the brake wire 90.

Referring back to FIG. 1, a first pair of wheel assemblies 266 and 267 are rotatably mounted to the outer frame members 22 and 24. In this example both wheel assembly 266 and wheel assembly 267 are structurally and functionally the same. Accordingly, only wheel assembly 266 will be discussed in detail.

Figure 13:
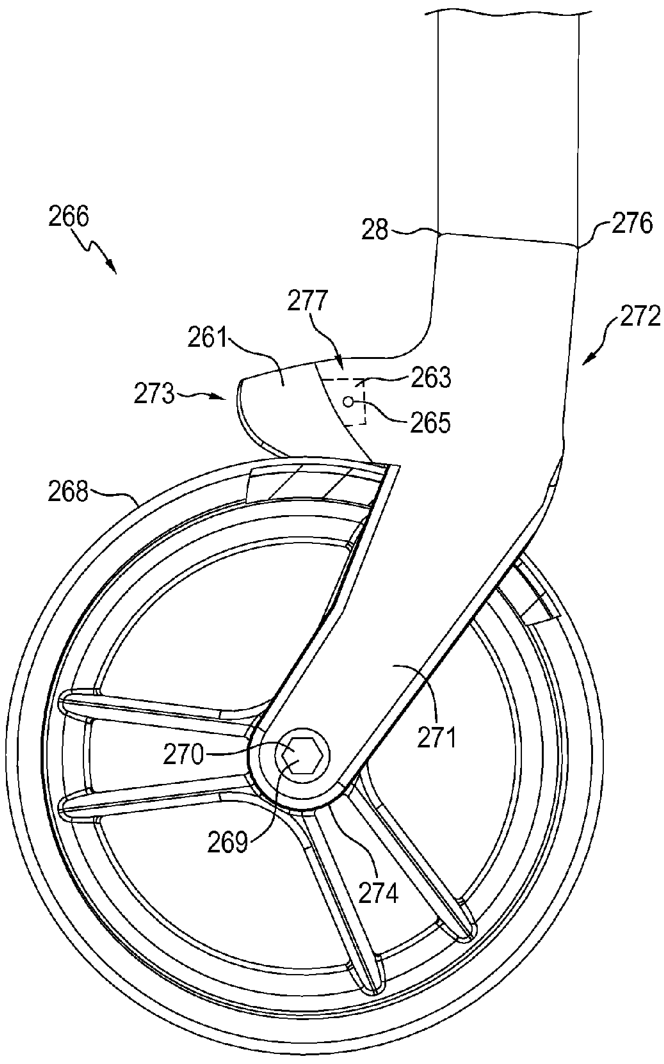
FIG. 13 is a side elevation view of a wheel assembly illustrating a brake housing according to one embodiment of the invention.
Figure 14:
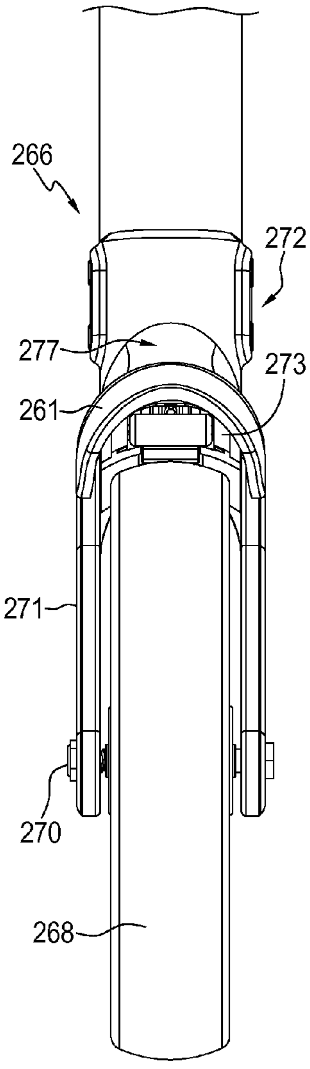
FIG. 14 is a rear elevation view of the wheel assembly and brake housing.

Referring to FIGS. 13 and 14, the wheel assembly 266 includes a brake pad assembly 272. The brake pad assembly 272 has a proximal end 276 that connects to the lower end 28 of the outer tube 62 of outer frame member 22. The brake pad assembly 272 has a bracket housing 271 that receives a ground-engaging wheel 268 at a distal end 274 of the brake pad assembly which is spaced-apart from the proximal end 276. An aperture 270 near the distal end 274 connects to the wheel 268 via a wheel axis 269. The brake pad assembly 272 includes a brake housing 277 between the proximal end 276 and the distal end 274. The brake housing 277 extends overtop of and along at least a portion of the wheel 268 and includes an interior 273. The brake housing 277 includes a removable covering portion 261 that has an inner portion 263 within the interior 273. The removable cover portion 261 connects to the rest of the brake housing 277 by means of a screw 265 which is Allen key removable in this example.

Figure 15:
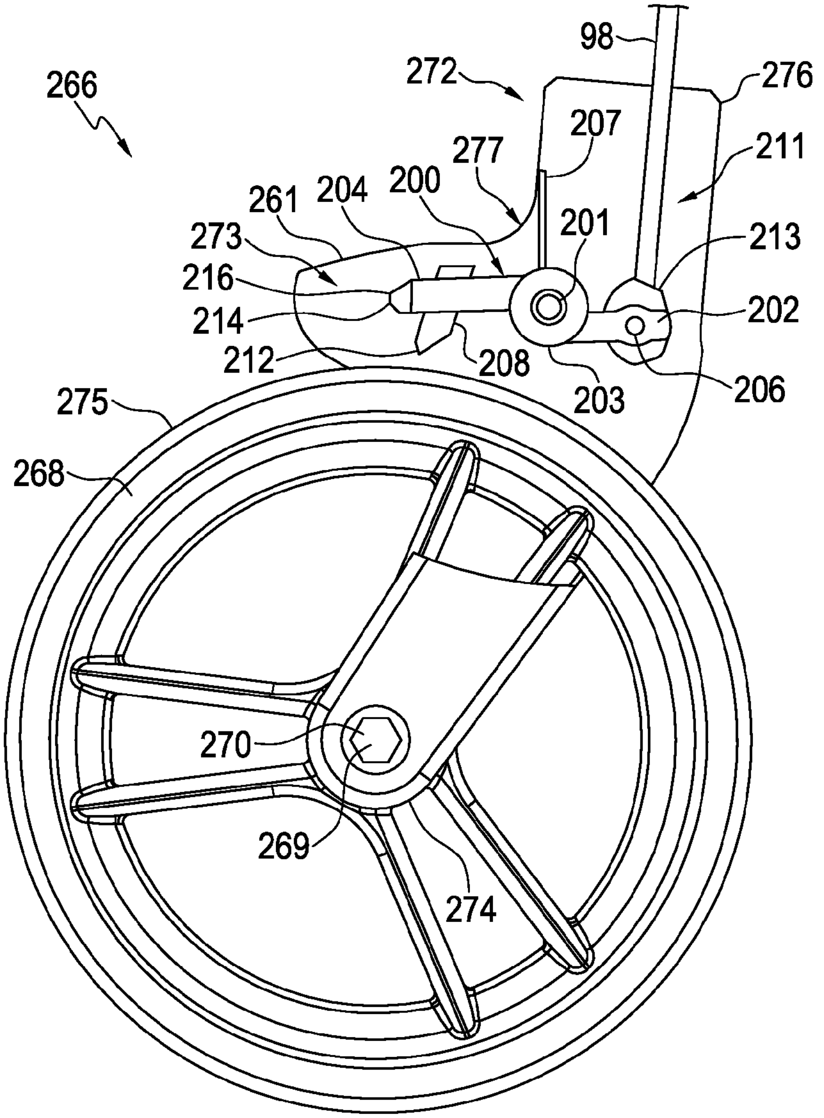
FIG. 15 is a side elevation view similar to FIG. 13 with the brake housing partially in section to illustrate a brake pad assembly in a non-actuated mode.
Figure 16:
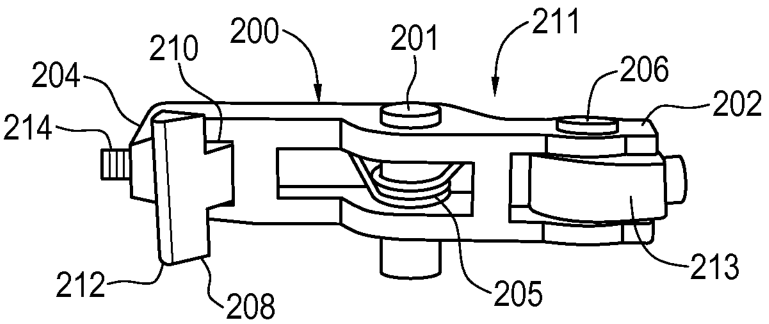
FIG. 16 is bottom plan view of the brake pad assembly of FIG. 15.
Figure 17:
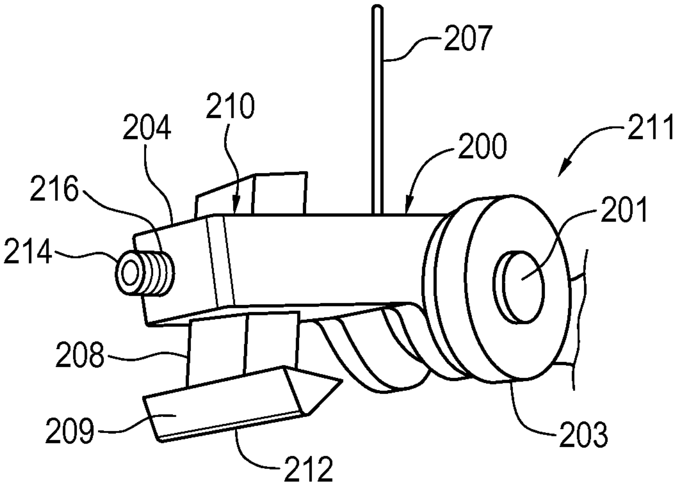
FIG. 17 is a rear perspective view of the brake pad assembly of FIG. 16 illustrating a brake pad and a means for fixing and adjusting the brake pad.

FIG. 15 shows the wheel assembly 266 with the brake housing 277 partially removed to show the interior 273. The brake pad assembly 272 includes a brake pad mechanism 211 located within the interior 273. The brake pad mechanism 211 includes a brake pad lever 200 pivotally mounted to the brake housing 277 via pivot rod 201 as best shown in FIG. 16. Bushings 203 on both ends of the pivot rod 201 are interposed between the brake pad lever 200 and the brake housing 277. A spring 205 is coiled around the pivot rod 201 and, as shown in FIG. 17, includes an outer portion 207 that extends outwardly away from the brake pad lever 200. The brake pad lever 200 has a first end 202 with a pivot 213 that connects to the brake rod 98. The brake pad lever 200 also has a second end 204 which is opposite the first end 202.

Figure 18:
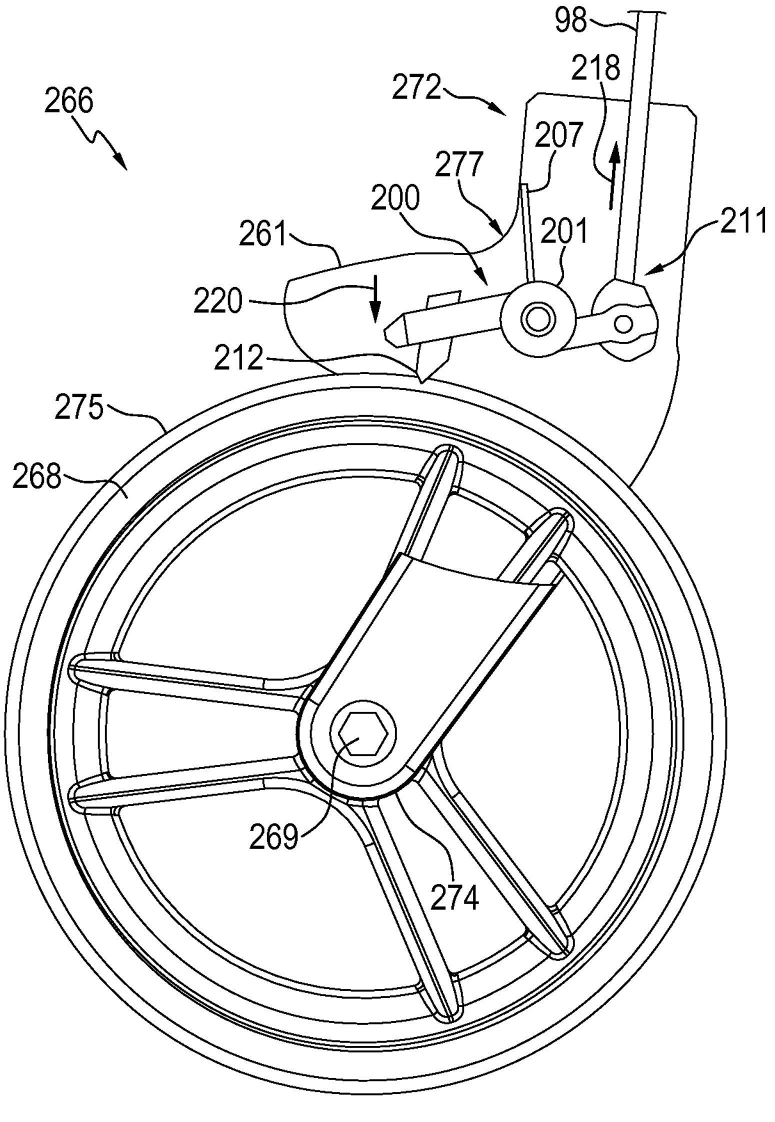
FIG. 18 is a side elevation view similar to FIG. 15 illustrating the brake pad assembly in an actuated mode with the brake pad engaging the wheel.

A brake pad 212 is located near the second end 204. As best shown in FIG. 17, it includes an elongate part 208 that is slidably insertable within a slot 210 of the brake pad lever 200. The brake pad 212 extends outwards from the slot 210 towards an outer periphery 275 of the wheel 268 shown in FIG. 15. The brake pad 212 includes a contact part 209 shown in FIG. 17 extending parallel to the wheel axis 269 for being engageable the wheel 268 as shown in FIG. 18. The brake pad 212 as a result is T-shaped in this example.

Referring back to FIG. 17, the brake pad mechanism 211 includes a means 214 for connecting the brake pad 212 within the slot 210 and for adjusting the position of the brake pad 212 relative to the wheel 268. The means 214 for connecting and adjusting is located at the second end 204 of the brake pad lever 200. In this example, the means for connecting and adjusting 214 is an Allen key adjustable screw that passes through aperture 216 to releasably abut the elongate part 208 of the brake pad 212. Referring to FIG. 15, the removable covering portion 261 is adjacent to the means 214 for connecting and adjusting. The brake housing 277 extends around the brake pad mechanism 211, including the means 214 for connecting and adjusting, to at least the outer periphery 275 of the wheel 268 for fully protecting the brake pad mechanism 211 thereby. Advantageously, the means 214 for connecting and adjusting is accessible upon removal of the covering portion 261.

The brake pad lever 200 is spring-biased via the outer portion 207 of the spring 205, which abuts against the brake housing 277 as shown in FIG. 15, to position the brake pad 212 spaced-apart from and adjacent to the outer periphery 275 of the wheel 268.

In operation, to brake the walker apparatus, the braking handle is either pulled upwards in the direction of arrow 93 for braking as shown FIG. 8 or pushed downwards for parking in the direction of arrow 95 as shown in FIG. 9. Either of these actions operatively actuates the brake wire 90, pulling the wire 90 to the right from the perspectives of FIGS. 8 and 9. This in turn actuates the gripping member 99 of FIG. 10 via metal plate 112 to engage or actuate the brake rod 98, as shown in FIG. 12. When brake rod 98 is actuated or, in other words, moved upwards from the perspective of FIG. 18 and as indicated by arrow 218, the brake pad lever 200 causes the brake pad 212 to engage the wheel 268 for inhibiting rotation of the wheel.

Referring back to FIG. 1, the walker apparatus 20 has a second pair of ground-engaging wheel assemblies, in this example, front wheel assemblies 308 and 310. These wheel assemblies 308 and 310 are similar to wheel assemblies 266 and 267 with the exception that they do not include brake pad assemblies or mechanisms.

Figure 3:
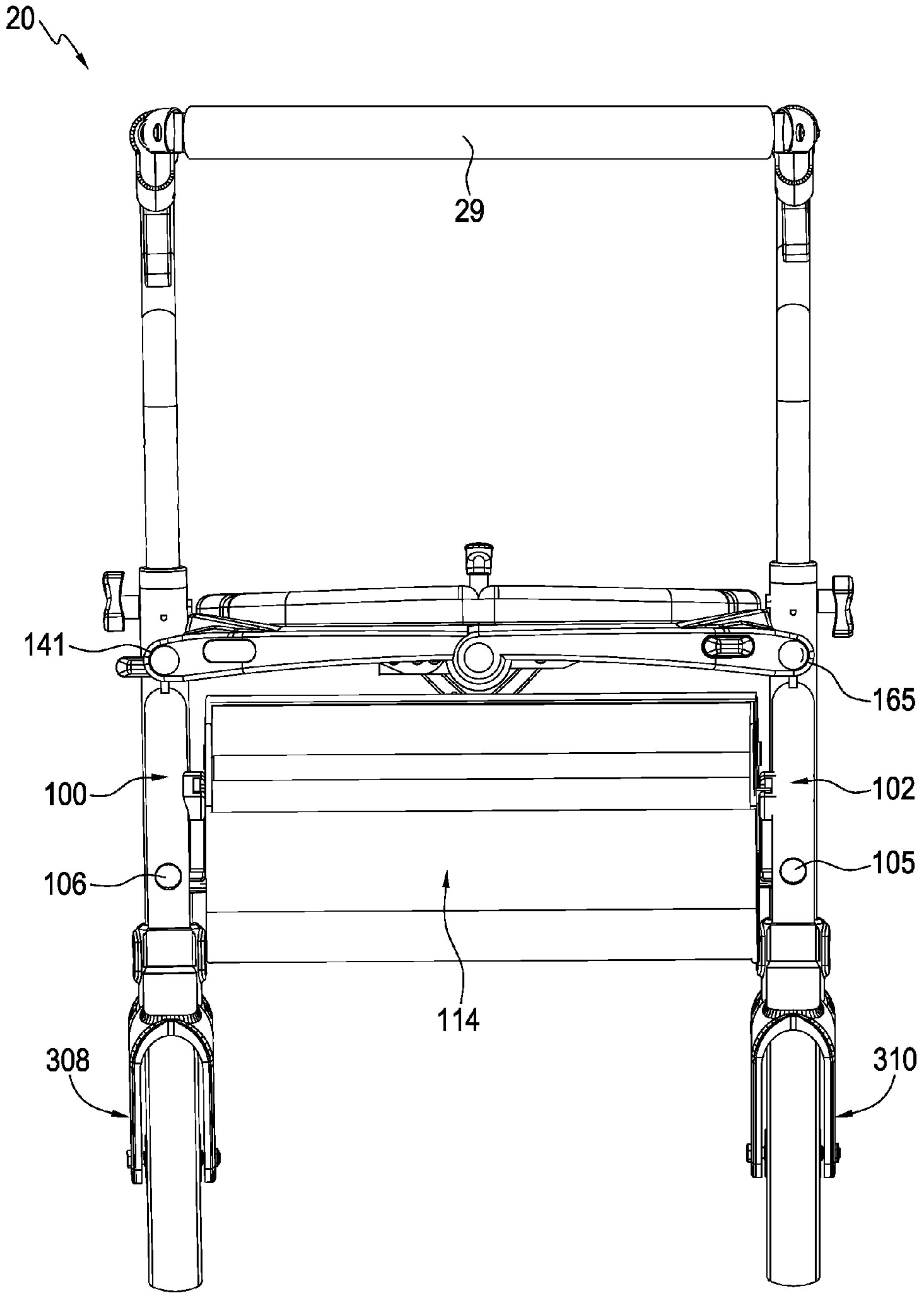
FIG. 3 is a front elevation view of the walker apparatus of FIG. 1.
Figure 4:
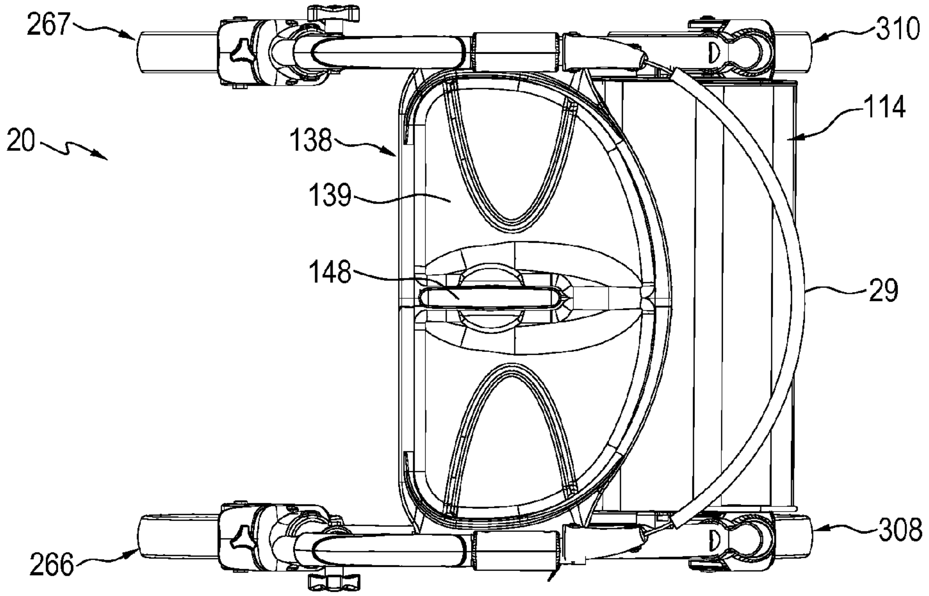
FIG. 4 is a top plan view of the walker apparatus of FIG. 1.

A pair of spaced-apart support members 100 and 102 connect together the first and second pair of wheel assemblies, as best shown in FIGS. 1 and 3. Each support member is the substantially the same and has the same structure and function. Only support member 100 will be discussed in detail. Support member 100 aligns with and extends from the outer tube 62 of the outer frame member 22 to a distal end 104 of the support member which connects to wheel assembly 308. The support member 100 is arc-shaped and partially circular. The support member 100 has an apex 307. The apex 307 is the most elevated point of the support member 100 from the perspective of FIG. 1. The apex extends towards the upper end 26 of the elongate member 22. A seat 139 for resting, which includes an extendable and retractable seat handle 148, connects to the apexes of the support members. The support members thereby support the seat 139. A rod 106 extends from the outer tube 62 of the outer frame member 22 to near the distal end 104 of the support member 100. The same applies with respect to rod 105 for corresponding support member 102 as partially shown for example in FIG. 3.

Referring to FIG. 1, the foldable walker apparatus includes a collapsible basket 114 that extends between the support members 100 and 102. The collapsible basket 114 is best shown in FIGS. 19 to 22. The collapsible basket 114 includes a basket member 125 made in this example of flexible fabric. The term fabric is used in the broadest sense of the word, and may include non-woven material, plastic, flexible sheets and other such materials. The basket member 125 in this example has a top 126 with abutting faces 123, 127 and 129. The top 126 has an opening 128 for inserting objects into an interior 130 of the basket member. The basket member 125 includes sides 131 and 133 that extend downwards from the top 126 from the perspective of FIG. 19. The sides 131 and 133 in this example are made of netting. A bottom 135 opposite the top 126 connects the sides 131 and 133. The bottom 135 in this example is made of continuous, non-netted fabric.

The collapsible basket 114 includes spaced-apart end members 118 and 118.1. Each end member, such as end member 118, is flat and includes a rigid peripheral portion which in this example is a wire loop in this example a 5-sided wire frame 131. The basket member 125 extends between and is supported by the wire frame of the end members. The end members are moveable towards each other when the walker apparatus is folded due to the flexibility of the basket member 125. The basket member may thereby fold to collapse the collapsible basket 114 when folding the walker apparatus. Importantly, this is possible without needing to remove the collapsible basket 114 from the walker apparatus.

Figure 19:
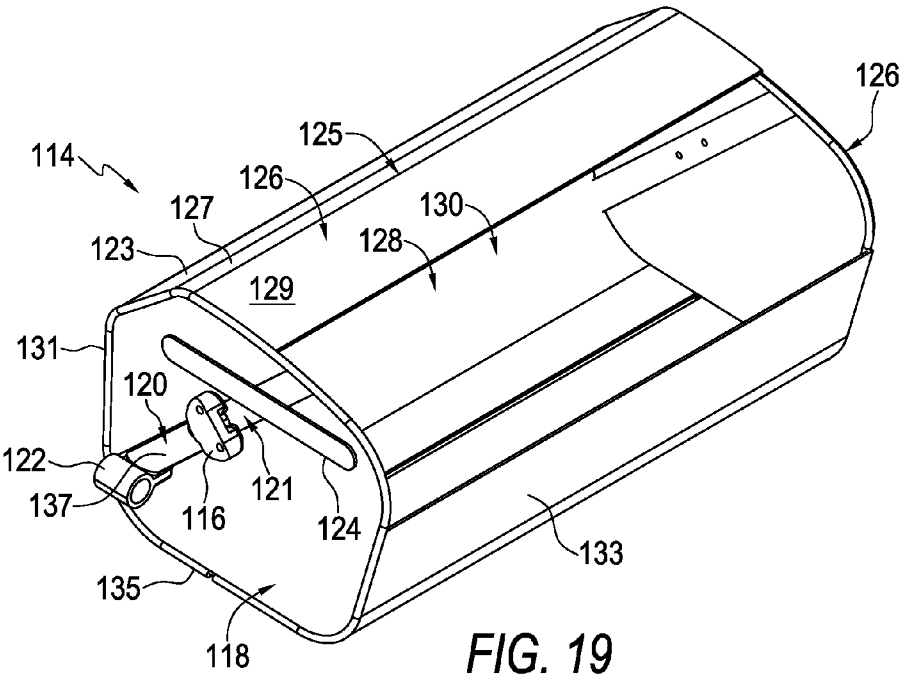
FIG. 19 is a top, front isometric view of a collapsible basket according to one embodiment of the invention.
Figure 20:
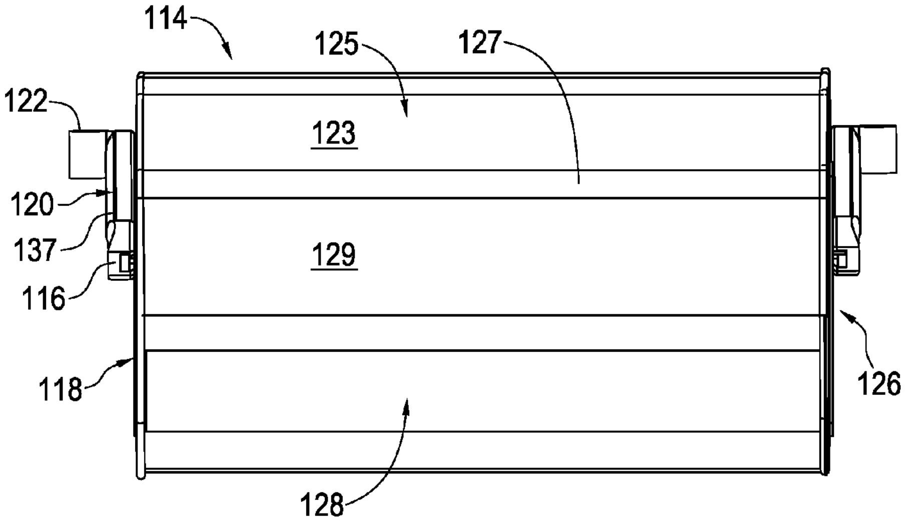
FIG. 20 is a top plan view of the collapsible basket of FIG. 19.

Each of the end members is substantially the same with the same structure and function. Only end member 118 will be discussed in detail with like parts of end member 118.1 having like numbers and the additional designation "0.1". As shown in FIG. 19, end member 118 in this example includes an insert 121 which diagonally extends from the top 126 to the side 131. The end member 118 may include a flap member 124 to further secure the insert 121 to the end member 118. The insert 121 includes an extended grooved projection 117 as best shown in FIG. 21A.

A connection bracket 120 is shaped through a grooved housing 137 to slidably receive the grooved projection 117. The groove housing 121 is best shown in FIG. 21A, which shows the connection bracket 120 partially in section. Referring back to both FIG. 19 and FIG. 1, the connection bracket 120 includes a first connector 116 which fastens the connection bracket 120 to the support member 100 near the distal end 104 of the support member 100. The connection bracket 120 includes a second connector 122 spaced-apart from the first connector 116 by the grooved housing 137. The second connector 122 fastens the connection bracket 120 to the rod 106. A substantially similar connection bracket 120.1 corresponds to the corresponding support member 102 and rod 105. The collapsible basket 114 is thereby slidably securable with and removable from the walker apparatus 20.

Figure 23:
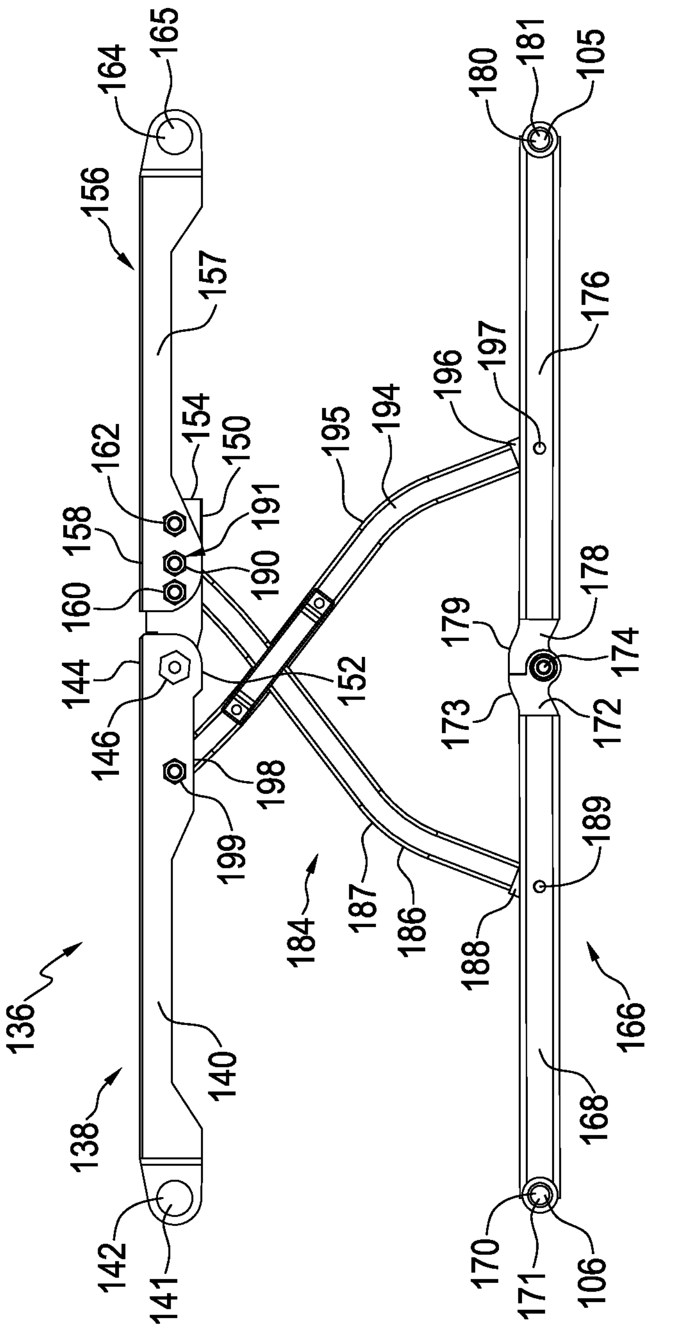
FIG. 23 is a front elevation view of a folding mechanism in an extended mode, according to one embodiment of the invention.
Figure 24:
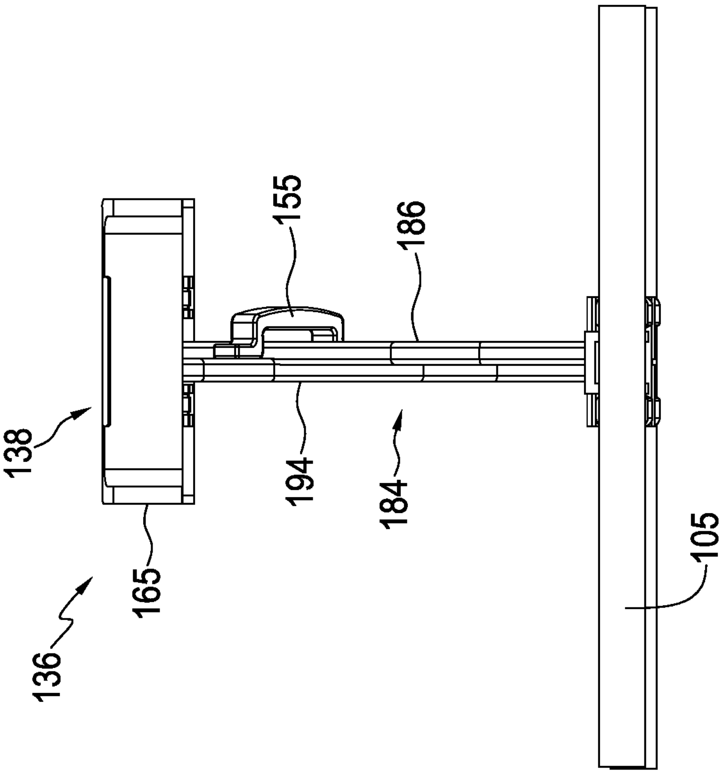
FIG. 24 is a side elevation view of the folding mechanism of FIG. 23.
Figure 25:
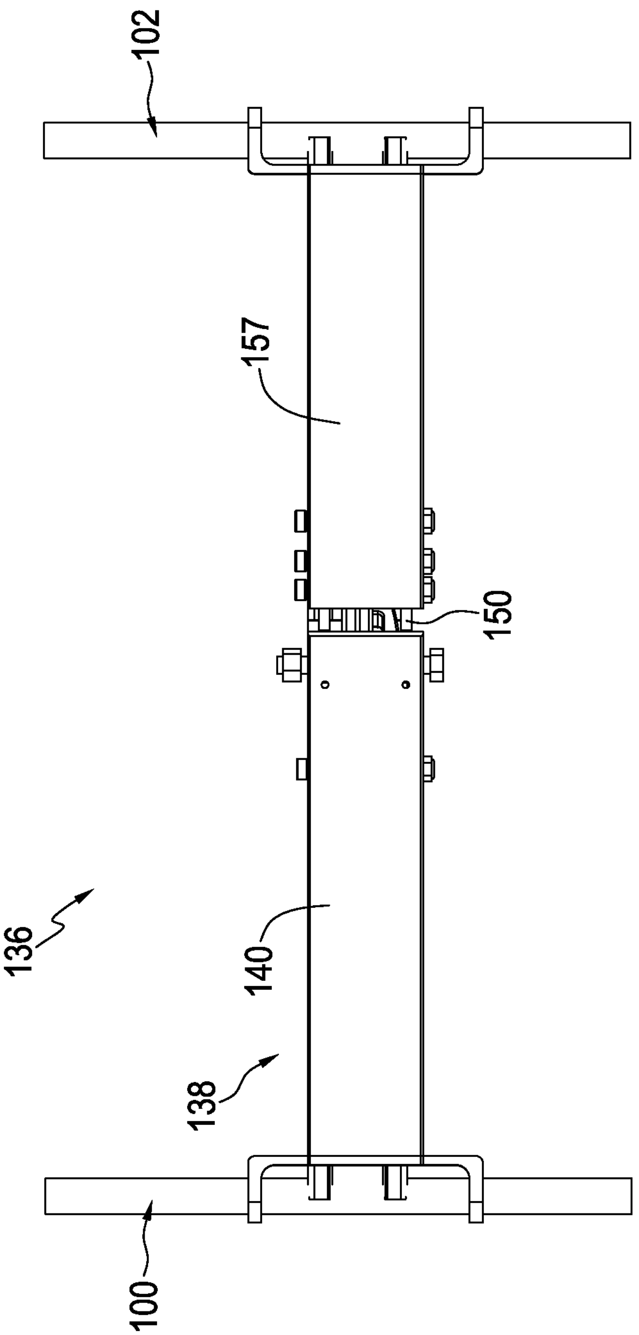
FIG. 25 is a top plan view of the folding mechanism of FIG. 23 in the extended mode.

The walker apparatus 20 includes a folding mechanism 136 as best shown in an unfolded mode in FIGS. 23 to 25. The folding mechanism may be referred to as a means for bringing together the frame members 22 and 24 for folding the walker. The folding mechanism 136 includes a pair of spaced-apart inner frame members 138 and 166. Inner frame member 136 includes a first part 140 and a second part 157. The first part 140 has a first end 142 that pivotally receives and thereby pivotally connects to the support member 100 via a first extended pivot rod 141, as shown by FIG. 23 in combination with FIG. 1. The first part 140 has a second end 144 spaced-apart from the first end 142. A pivot 146 at the second end 144 pivotally connects the first part 140 to a hinge member 150.

The second part 157 includes a first end 158 with a bolt 160 that connects the second part 157 to the hinge member 150. Bolt 162 near the first end 158 also connects the second part 157 to the hinge member 150. The first part 140 and the second part 157 of the inner frame member 138 are thereby hingedly connected together. The second part 157 has a second end 164 which is spaced-apart from the first end 15. The second end pivotally receives and thereby pivotally connects to the support member 102 via a second extended pivot rod 165, as shown by FIG. 23 in combination with FIG. 1.

The inner frame member 166 includes a first part 168 and a second part 176 that are pivotally connected together via pivot 174. The first part 168 has a first end 170 with a connector 171 that pivotally receives and thereby pivotally connects with the rod 106. The first part 168 has a second end 173 with teeth 172 extending therefrom above and over top of the pivot 174. The second part 176 has a first end 179 with teeth 178 extending therefrom above and over top of the pivot 174. The teeth 172 and 178 are positioned to inter-engage in an over-the-center action in the extended mode and thereby inhibit further movement of the inner frame members towards the lower ends of the outer frame members. The second part has a second end 180 with a connector 181 that pivotally receives and thereby pivotally connects with the rod 105.

The folding mechanism 136 includes a pair of link members 184 including a first link member 186 and a second link member 194 which form an x-shaped arranged when fully open. The first link member 186 pivotally connects at a first end 188 via pivot 189 to the first part 168 of the inner frame member 166. The first link member 186 pivotally connects at a second end 190 via pivot 191 to the second part 157 of the inner frame member 157 near the first end 158. The first link member 186 includes a bend 187 that extends outwardly towards the adjacent outer frame member 22. In this example, the bend 187 extends towards the first end 142 of the first part 140 of the inner frame member 138.

The second link member 194 pivotally connects at a first end 196 via pivot 197 to the second part 176 of the inner frame member 166. The second link member 194 pivotally connects at a second end 198 via pivot 199 to the first part 140 of the inner frame member 138 near the second end 144. The second link member 194 includes a bend 195 that extends outwardly towards the outer frame member 24. In this example, the bend 195 extends towards the second end 164 of the second part 157 of the inner frame member 138. As best shown in FIG. 24, a square bracket 155 outwardly extends from the second link member 194 to enable the first link member 186 to slidably pass therethrough. The pair of link members 184 thereby diagonally extend between and operatively connect the inner frame members 138 and 166 together.

Figure 26:
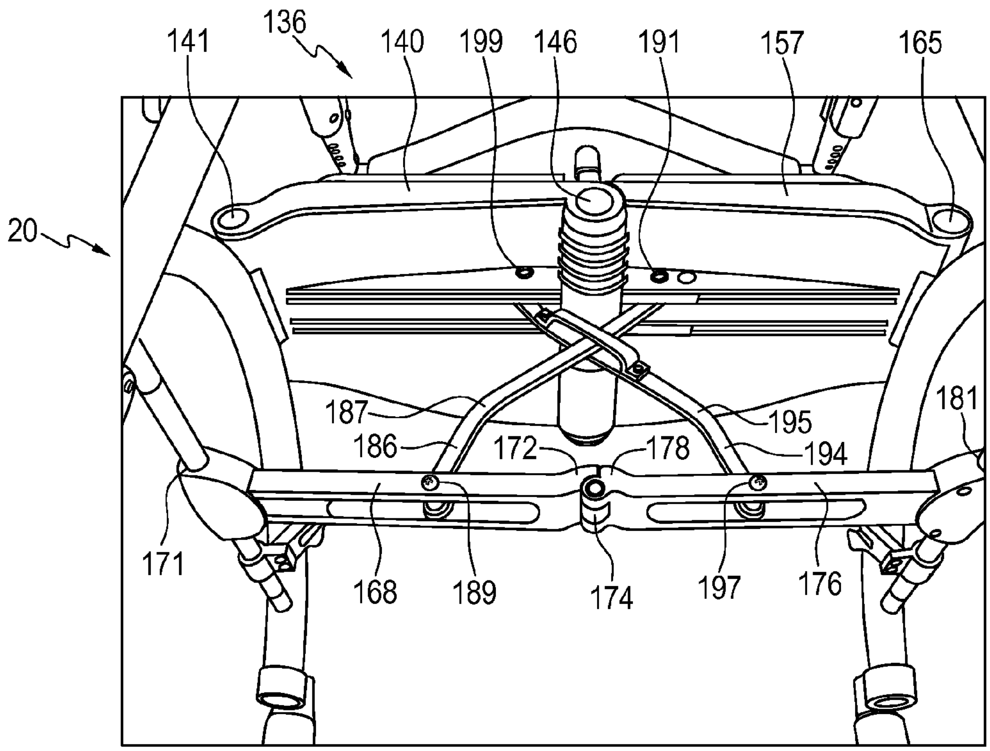
FIG. 26 is a rear, bottom perspective view of the folding mechanism in the extended mode together with the walker apparatus.
Figure 27:
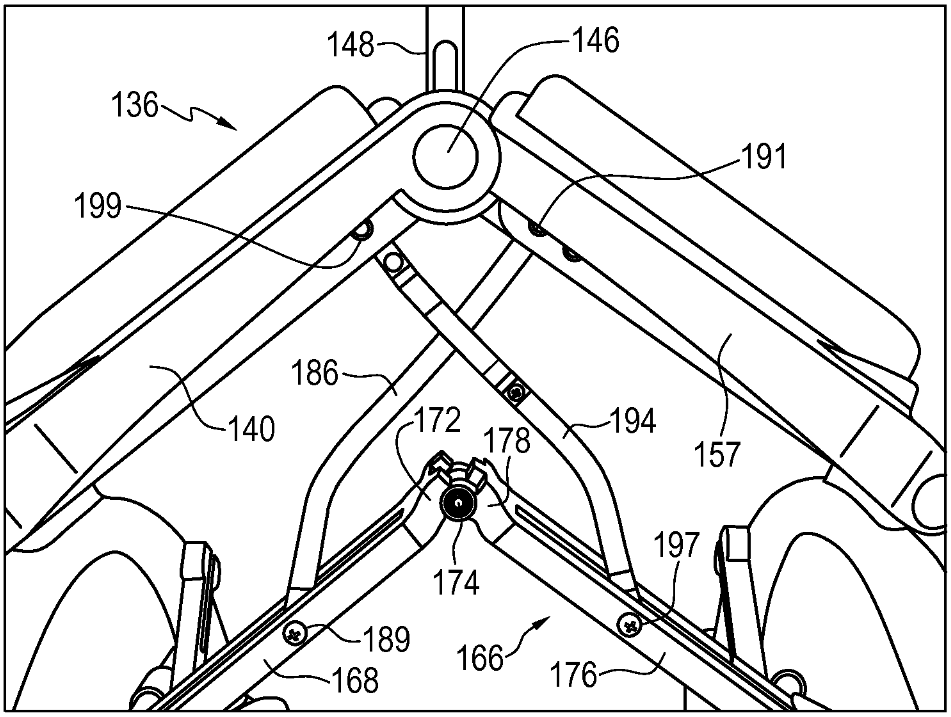
FIG. 27 is a rear elevation view of the folding mechanism of FIG. 26 in a partially folded mode.
Figure 28:
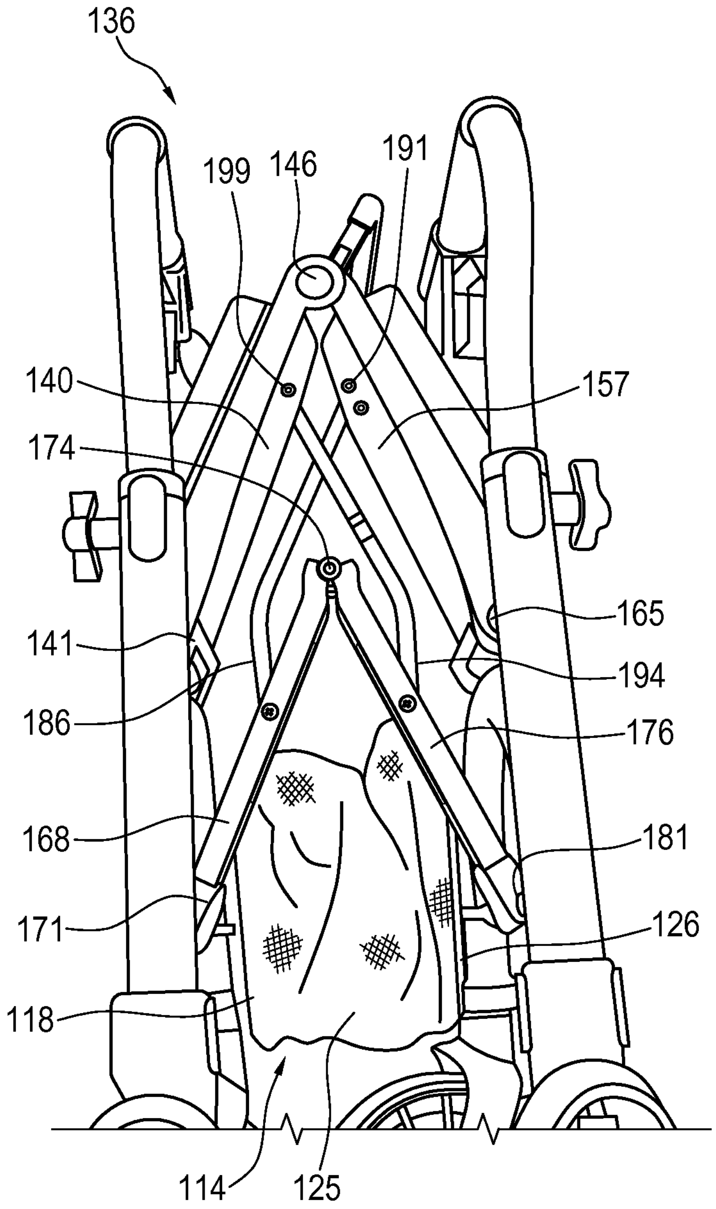
FIG. 28 is a rear elevation view of the folding mechanism and walker apparatus in a fully folded mode.
Figure 29:
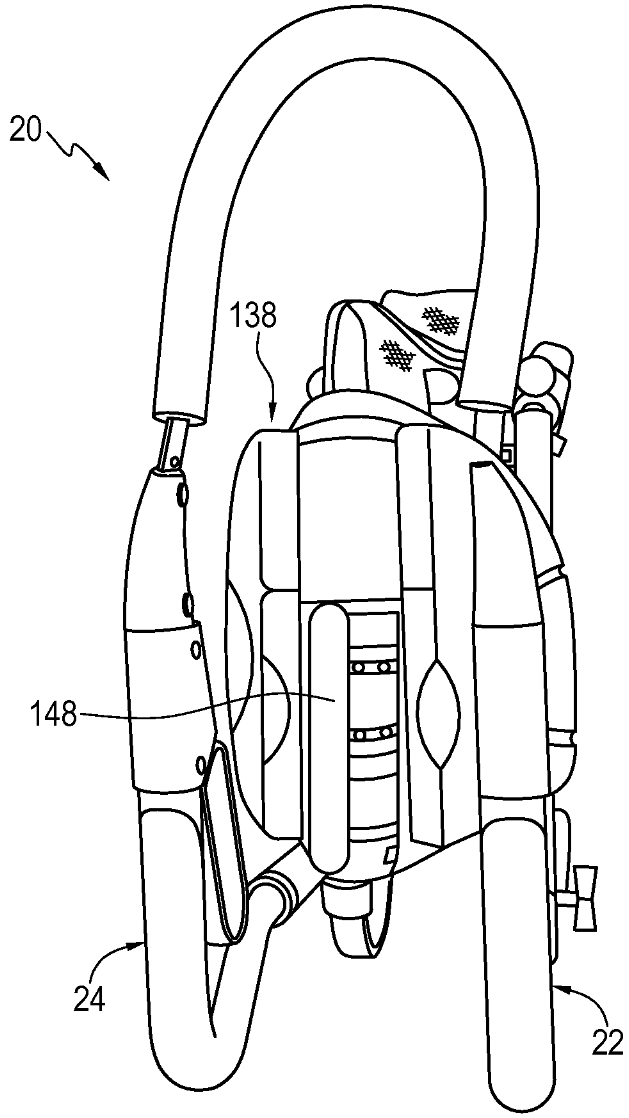
FIG. 29 a top plan view of the walker apparatus illustrated in FIG. 28 in the fully folded mode.
Figure 30:
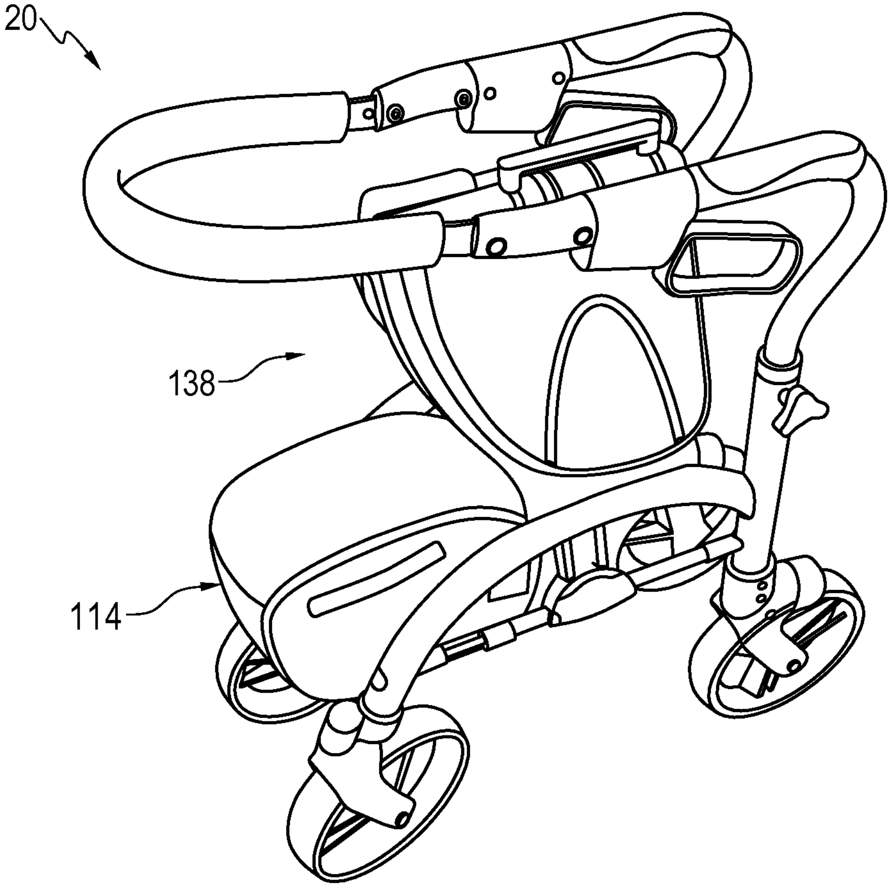
FIG. 30 a top, front isometric view of the walker apparatus in the fully folded mode.

The operation of the folding mechanism 136 is illustrated in FIGS. 26 to 30. FIG. 26 shows the folding mechanism 136 on the walker apparatus 20 in the unfolded or fully open mode. FIG. 27 shows the folding mechanism 136 in a partially folded mode. The user pulls the seat handle 148 upwards from the perspective of the FIG. 27. This causes the first part 140 and the second part 157 of the inner frame member 136 to fold through pivot 146 together and towards each other. Because the link members 186 and 194 are connected close to the seat handle 148, the actuation of the seat handle 148 also causes the first link member 186 and the second link member 194 to pull the first part 168 and the second part 176 of the inner frame member 166 to fold together and towards each other by means of pivot 174. The inner frame members continue to fold together until a fully folded mode is reached as shown in FIGS. 28 to 30. The foldable walker 20 is thereby laterally folded together in a compact, upright manner, with the outer frames 22 and 24 coming together. Advantageously, the foldable walker 20 may remain standing in the fully folded mode and be moved like a piece of luggage on wheels.

The structure of the present invention provides many advantages. For the brake pad assembly, because both the brake pad mechanism 200 and means 214 for connecting and adjusting are within the brake housing 277, the life of these components is prolonged by the housing, inhibiting the entry of dirt and rocks therein. Also, the brake housing 277 provides a compact, streamline solution for covering the mechanism 200 and means 214 so as to protect the interior against general wear and tear, to inhibit damage from the user's feet, and to inhibit entanglement with the user's clothes, which ensures that the walker apparatus is safer. Conveniently, when the brake pad needs adjusting, the covering portion 261 is readily removable for accessing the means 214.

The brake rod of the present invention provides the advantage of being self-adjusting and without requiring user intervention or being accessible to the user. The gripping member 99 may slide along the brake rod until such time as braking is needed. The gripping member 99 continues to be engageable to operate for braking even if the thumb screw is loose, unscrewed, strip-threaded or otherwise damaged. This provides an added layer of safety for the user as it inhibits the user from tampering with or adjusting the brake rod assembly. It is provides the advantage of ensuring that braking still works when the user needs to brake but, for example, where the walker apparatus has been damaged through an accident, or where the user does not have the sufficient dexterity to make other adjustments.

The frame shape of the walker apparatus, and in particular the support members 100 and 102 with their arc-shape provide the advantage of allowing a light, aircraft-quality aluminum to be used while still maintaining high strength and support requirements. In one example, the structure with the seat 139 resting on the apexes of the support members provides a rated weight capacity of at least 300 lbs. Because the frame locates the seat 139 in the middle of the walker apparatus, that is, halfway between the wheels, the frame thereby provides a walker apparatus that is more stable and therefore safer.

The collapsible basket 114 has the advantage of requiring very few parts: simply two connectable end members each having a rigid peripheral portion with fabric stretching around therebetween. The basket 114 is more user-friendly in that it can remain connected to and need not be removed the walker apparatus when the walker is folded. The basket 114 connects and folds in such a manner as to not comprise the integrity of the support members 100 and 102 or other aspects of the walker frame. Because the sides 131 and 133 are made of netting as opposed to continuous fabric, this allows the basket 114 to fold even more easily.

The folding mechanism provides a structure that better promotes lateral support and is therefore more robust. The bends 187 and 195 offer more resistance to shear forces acting, for example, against the support members. Because the links 186 and 194 intersect, they inhibit torsional twisting of the frame of the walker apparatus. The inner frame members 136 and 166 further promote lateral support. This means that the folding mechanism only requires two cross links 186 and 194 for its functioning and therefore uses fewer parts. This results in the advantage of providing a folding mechanism that is easier to manufacture and thus less expensive. The bends 187 and 195 also enable the folding mechanism to fold laterally in a more compact manner.

Because the links 186 and 194 are spaced inwardly from the support members 100 and 102, this provides the walker apparatus with a folding mechanism that is more compact and less likely to tangle with the user's clothing. Also, it results in a folding mechanism that is more durable if the walker is dropped or otherwise damaged because the links 186 and 194 are adjacent to the support members 100 and 102 and seat 139.

Figure 31:
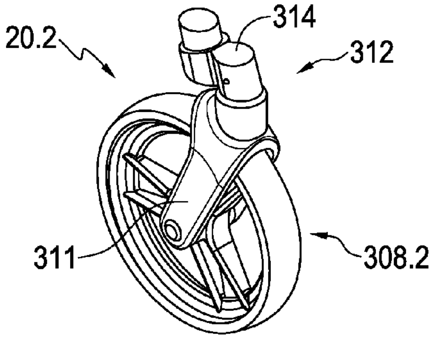
FIG. 31 is top perspective view of part of a walker apparatus, including a front wheel assembly and a mounting assembly, according to another embodiment.
Figure 32:
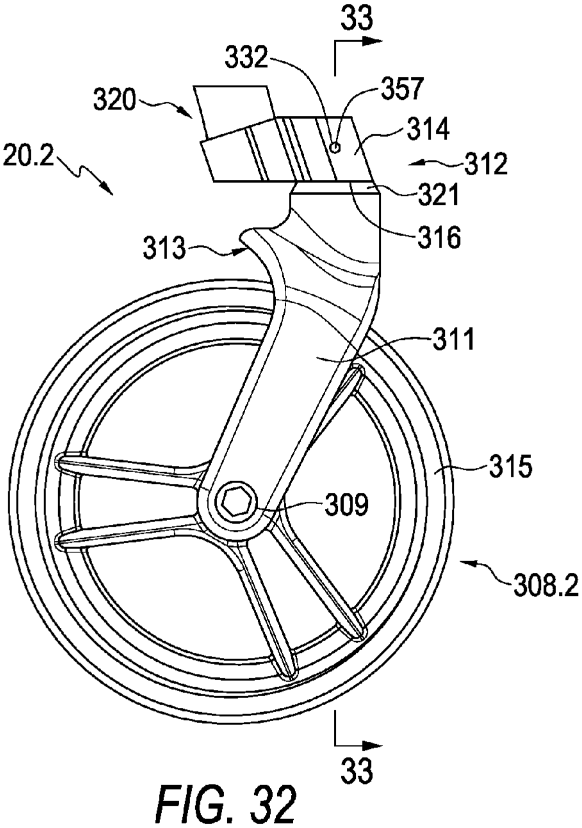
FIG. 32 is a side elevation view of the part of the walker apparatus shown in FIG. 31.
Figure 33:
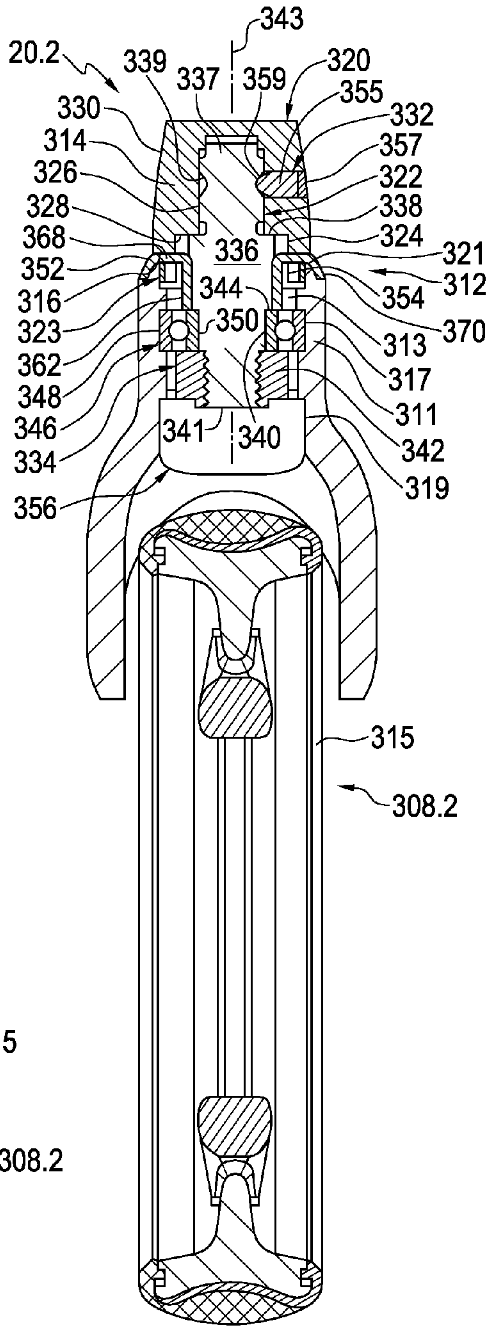
FIG. 33 is a front elevation section view taken along the lines 33-33 of the part of the walker apparatus shown in FIG. 32.

FIGS. 31 to 36 are directed to a walker apparatus 20.2 and more particularly a front wheel assembly 308.2 and a mounting assembly 312 therefor according to a further embodiment. Like parts have like numbers and function as in the previous embodiment with the addition of "0.2". Only part of walker apparatus 20.2 is shown in FIGS. 31 to 33, and the rest of the walker apparatus 20.2 is substantially similar to that shown in FIGS. 1 to 30 with the exception of the front wheel assembly 308.2 and the mounting assembly 312.

As shown in FIG. 32, the front wheel assembly 308.2 includes a pivotable wheel fork 311 and a ground-engaging wheel 315 received within interior 313 of the fork 311. The fork 311 includes a bottom or first end 309 configured to pivotally engage and connect with the wheel 315, in a known and conventional manner. The fork 311 includes a top or second end 321 opposite the first end 309, as best shown in FIG. 33. The fork 311 includes a bore in this example an upper bore 323 extending from the second end 321 towards the first end 309 of the fork. The fork 311 includes an annular groove 317 spaced-apart from end 321 and disposed within interior 313 of the fork. The fork 311 also includes a bore in this example a lower bore 319 spaced-apart from the upper bore 323 and spaced-apart from the groove 317. Lower bore 319 faces the wheel 315.

The mounting assembly 312 includes a frame portion in this example shaft housing 314 having an open first end 316 facing the wheel fork 311 and a closed second end 320 opposite the first end. As shown in FIG. 32, the second end 320 of the shaft housing 314 is configured to couple with lower end 104 of the outer frame or support member 100, which is for example shown in FIG. 1, and thus shaft housing 314 may be said to form part of the support or outer frame member 100.

Referring to FIG. 33, the shaft housing 314 includes a bore 322 that extends from the first end 316 towards the second end 320 of the shaft housing. The bore 322 has a first portion 324 adjacent to the first end 316 and a second portion 326. The first portion 324 has a larger diameter relative to portion 326. A shoulder 328 is disposed between first portion 324 and second portion 326.

The shaft housing 314 includes an exterior 330 and a second bore 332. The second bore 332 is disposed between the first end 316 and the second end 320 of the shaft housing. Second bore 332 extends from the exterior 330 of the shaft housing to the first bore 322 in a direction generally perpendicular to the first bore, in this example. The bore 332 extends horizontally when the walker apparatus is in use in this example.

The mounting assembly 312 includes a shaft assembly 334 which includes a shaft 336. Shaft 336 defines a rotational axis 343. The shaft has a first end 337 disposed within the first bore 322 so as to be coupled to the shaft housing. In this example the shaft may be either press fitted within or threadably connected to portion 326 of the bore 322. The shaft has a recess 339 located adjacent to the first end. The recess 339 is annular and rounded in this example. The shaft 336 includes an annular shoulder 338 spaced-apart from the first end 337. The shaft 336 is configured such that when the annular shoulder 338 abuts shoulder 328 of the shaft housing 314, recess 339 is aligned with the second bore 332 of the shaft housing 314. The shaft partially extends within interior 313 of the wheel fork 311. The shaft 336 has a second end 341 opposite the first end 337 of the shaft. In this example second end 341 is threaded and disposed within interior 313 of the wheel fork 311.

The shaft assembly 334 in this example includes a nut, in this example a locknut 342 threadably engageable with the second end 341 of the shaft 336. Locknut 342 has in this example a nylon interior which abuts with the shaft and inhibits the nut from dislodging and being unscrewed through vibrations and the like. The shaft assembly 334 also has an annular recess 340 disposed between ends 337 and 341 of the shaft. The recess 340 in this example is formed by annular shoulder 344 of the shaft and locknut 342, which may be said to form another shoulder, the annular recess thus being disposed between a pair of spaced-apart annular shoulders. Annular shoulder 344 is disposed within interior 313 of the wheel fork and is located between ends 337 and 341 of the shaft. The shaft is configured such that when shoulder 338 of the shaft abuts with shoulder 328 of the shaft housing 314, recess 340 aligns with annular groove 317.

The mounting assembly 312 includes a bearing 346 having an outer race 348 and an inner race 350. Outer race 348 is partially disposed within the annular groove 317 of the wheel fork 311 and is coupled to the wheel fork 311 thereby. Inner race 350 is partially disposed within recess 340 of the shaft assembly and abuts the pair of shoulders formed by shoulder 344 and locknut 342. The bearing thus rotatably supports the shaft 336. Bearing 346 allows the wheel fork 311, and thus front wheel assembly 308.2, to freely rotate relative to the shaft 336 and the shaft housing 314.

Figure 34:
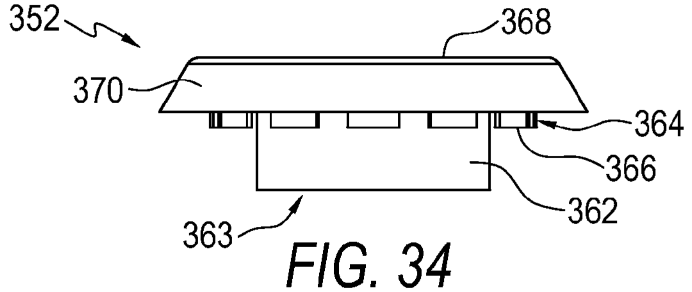
FIG. 34 is an elevation view of a front fork cap of the mounting assembly shown in FIG. 31.
Figure 35:
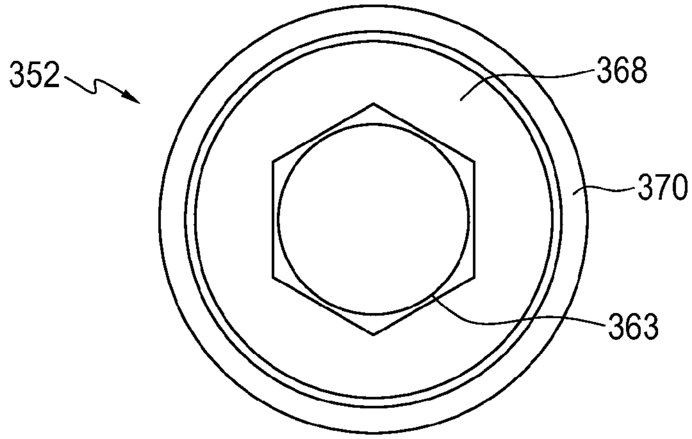
FIG. 35 is a top plan view of the front fork cap shown in FIG. 34.
Figure 36:
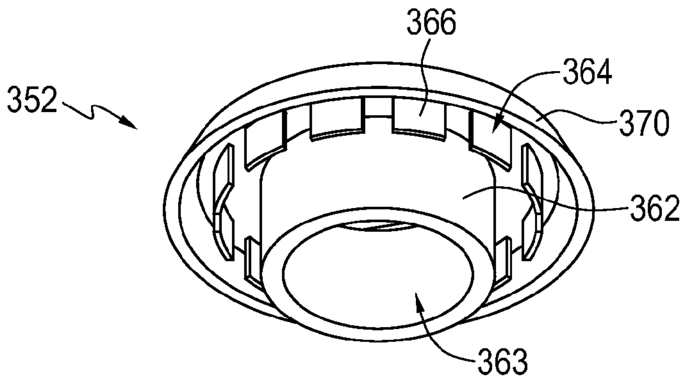
FIG. 36 is a bottom perspective view of the front fork cap shown in FIG. 34.

The mounting assembly 312 also includes an alignment member in this example a front fork cap 352 that extends around the shaft and which is partially disposed between the wheel fork and the shaft housing. The front fork cap 352 is best shown in FIGS. 34 to 36. The front fork cap 352 includes a first portion 362 configured to extend around and abut with shaft 336, as shown in FIG. 33. Referring back to FIGS. 34 to 36, first portion 362 is tubular in this example, with a generally cylindrical shape. In this regard, the front fork cap 352 includes an aperture 363 that extends through first portion 362. As shown in FIG. 33, the first portion 362 of the front fork cap 352 abuts inner race 350 of bearing 346 in this example.

Referring back to FIGS. 34 to 36, the front fork cap 352 includes a resilient second portion 364 configured to abut against the portion of the wheel fork 311 surrounding upper bore 323, as shown in FIG. 33. Second portion 364 of the front fork cap 352 has a generally cylindrical shape. The second portion 364 is spaced-apart from bearing 346. In this example the second portion 364 is made up of a plurality of spaced-apart, resilient projections 366 arranged in an annular manner. The projections 366 press up against and slidably engage with the portion of the wheel fork 311 surrounding bore 323. The projections are slightly curved, generally rectangular in shape and in this example are in the form of vertical, plastic blades. The front fork cap 352 thus rotatably aligns and supports pivoting of the wheel fork about the shaft 336. Put another way, the front fork cap is so configured promotes a consistent alignment of the wheel fork 311 with the rotational axis 343.

The front fork cap 352 includes a top 368 that extends between and connects together the first portion 362 of the front fork cap and the second portion 364 of the front fork cap. Top 368 radially extends outwards relative to the shaft 336, as shown in FIG. 33. The first portion 362 and the second portion 364 extend outwards from the top in this example in a generally perpendicular manner relative to top 368. As shown in FIG. 33, the top 368 of the front fork cap 352 abuts with the first end 316 of the shaft housing 314.

As shown in FIGS. 34 and 36, the front fork cap 352 includes a peripheral, rim portion 370 that radially extends outwards and downwards from the top 368. Rim portion 370 is configured to fit over top of and abut with the second end 321 of the wheel fork 311, as shown in FIG. 33. The front fork cap 352 thus has a generally mushroom-like shape with aperture 363 extending therethrough.

As shown in FIG. 33, the assembly 312 includes a bushing 354 disposed within interior 313 of the wheel fork 311. The bushing 354 extends around and presses up against the front fork cap 352, while also abutting with the wheel fork 311.

The mounting assembly 312 further includes a securing member 355 partially disposed within and through the second bore 332 of the shaft housing 314 so as to be coupled to the shaft housing. As seen in FIG. 33, the securing member 355 has a tapered end 359. The securing member 355 is disposed to engage with recess 339 of the shaft 336 via its end 359 and thus be coupled to the shaft. The shaft assembly 334 is fixedly mounted to the shaft housing 314 thereby. The securing member 355 is a pin in this example but could be a split tube that is press fit within and through the second bore. Alternatively the second bore 332 may be threaded and the securing member may take the form of a threaded member for selectively engaging with and through the second bore, such as a set screw.

The assembly 312 in this example also includes a rubber grommet 357 shaped to fit within bore 332. Grommet 357 is configured to protect securing member 355 from debris and/or damage.

The mounting assembly 312 further includes a removable, protective cap 356 disposed within lower bore 319 of the wheel fork 311. The protective cap 356 is disposed within the interior of the wheel fork and disposed between the shaft 336 and wheel 315. The protective cap 356 is shaped to inhibit debris from the wheel from reaching the shaft assembly 334, the bearing 346, the alignment member 352 or parts of the shaft housing 314, including bores 322 and 332.

Figure 37:
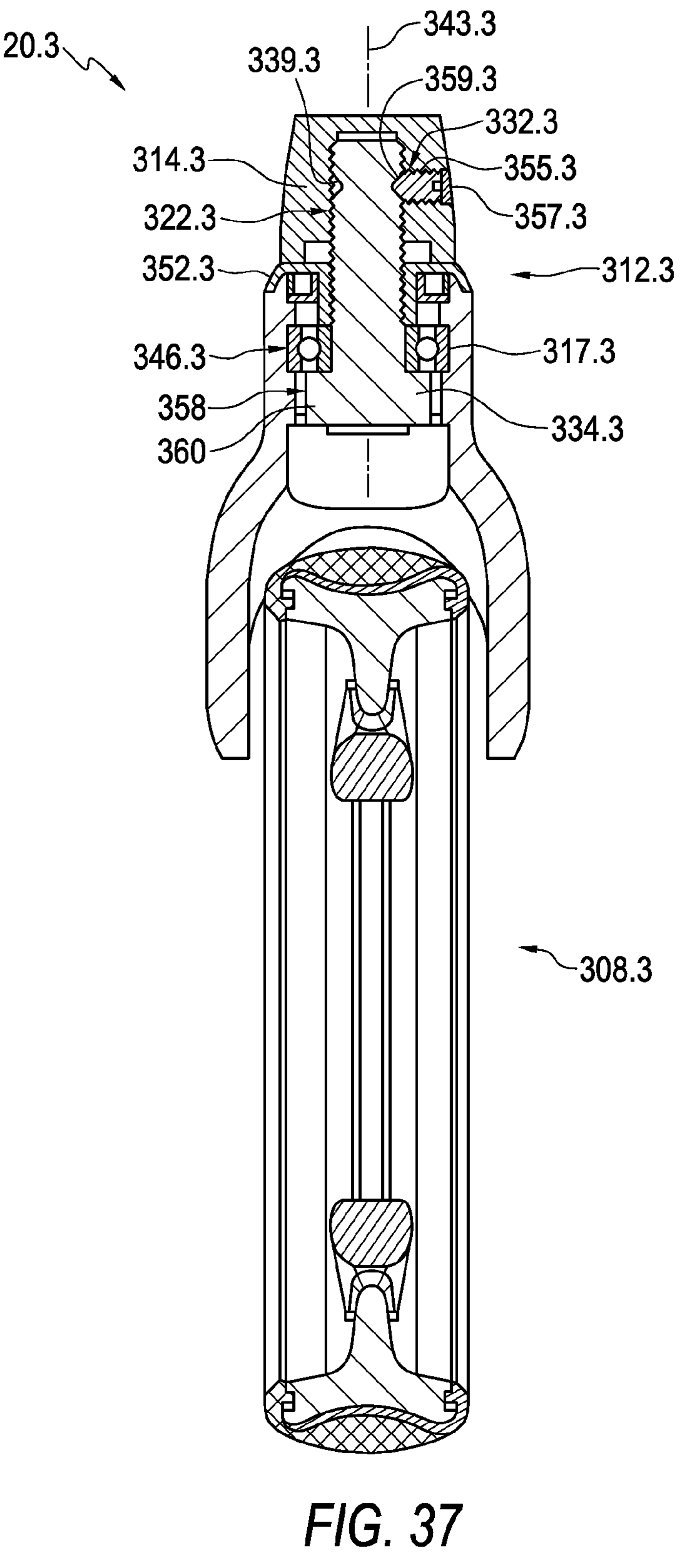
FIG. 37 is a front elevation section view similar to FIG. 33 of part of a walker apparatus, including a front wheel assembly and a mounting assembly, according to yet a further embodiment.

FIG. 37 is similar to FIG. 33 and shows part of a walker apparatus 20.3 and more particularly a front wheel assembly 308.3 and a mounting assembly 312.3 therefor according to a yet further embodiment. Like parts have like numbers and function as those shown in FIGS. 31 to 37 and FIGS. 1 to 30 with the addition of "0.3". The rest of the walker apparatus 20.3, only partially shown in FIG. 37, is otherwise substantially similar to that shown in FIGS. 1 to 30.

The shaft assembly 334.3 in this example takes the form of a bolt 358. The bolt 358 threadably engages with bore 322.3 but may, in the alternative, be press fitted to portions of the shaft housing 314.3 surrounding the bore. The bolt 358 includes a head 360, which takes the part, form and function of locknut 342 of the embodiment shown in FIG. 33. Bearing 346.3 is disposed within annular groove 317.3 and is disposed between front fork cap 352.3 and head 360 of the bolt. Bore 332.3 is threaded in this example. Securing member 355.3 is shown in this example in the form of a set screw that threadably engages with and through bore 332.3. Annular recess 339.3 is generally v-shaped in cross-section. The set screw is shaped to fully abut with the bolt 358 via recess 339.3.

Figure 39:
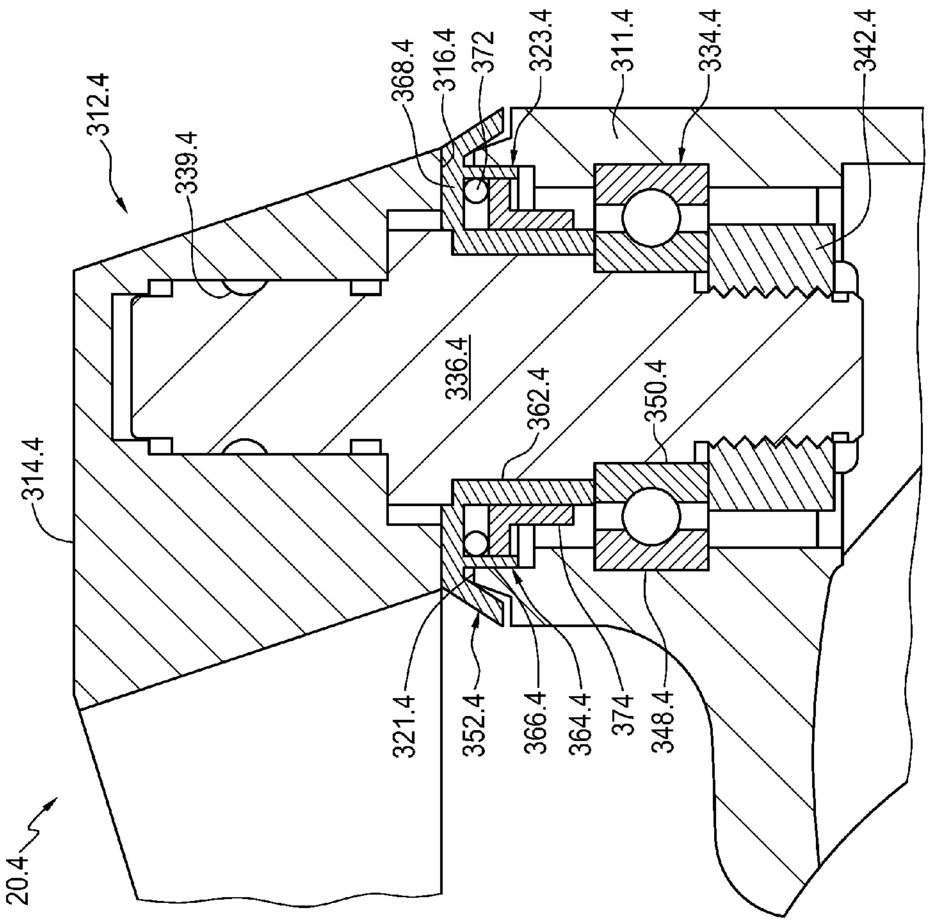
FIG. 39 is a side elevation section view taken along the lines 38-38 of the part of the walker apparatus shown in FIG. 38.
Figure 38:
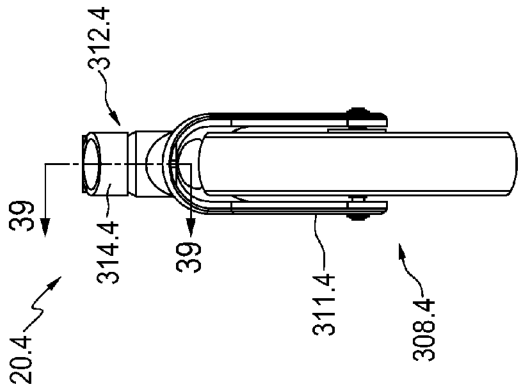
FIG. 38 is front elevation view of part of a walker apparatus, including a front wheel assembly and a mounting assembly, according to an even further embodiment.

FIGS. 38 and 39 show part of a walker apparatus 20.4 and more particularly a front wheel assembly 308.4 and a mounting assembly 312.4 therefor according to a yet further embodiment Like parts have like numbers and function as those shown in FIGS. 31 to 36 and FIGS. 1 to 30 with the addition of "0.3". The rest of the walker apparatus 20.4, only partially shown in FIGS. 38 and 39, is otherwise substantially similar to that shown in FIGS. 1 to 30.

As shown in FIG. 39, in this embodiment the mounting assembly 312.4 includes a resilient member, in this example an annular wire spring 372. In one preferred example the spring is a c wire spring, made of steel and hardened to 55 degrees centigrade. Spring 372 is disposed within the upper bore 323.4 and is disposed adjacent to the second portion 364.4 of the front fork cap 352.4. Spring 372 is configured to further bias second portion 364.4 of the front fork cap 352.4 and more particularly the annular projections 366.4 against the wheel fork 311.4.

Mounting assembly 312.4 also includes a spring lock ring 374 shaped extend around and abut with the first portion 362.4 of the front fork cap 352.4. In this example the ring 374 has an inverted “L” shape in section. The ring 374 is configured to bias spring 372 towards the top 368.4 of the front fork cap 352.4, thus causing the spring 372 to be adjacent to end 321.4 of the wheel fork 311.4.

The walker apparatus and mounting assembly as described herein provides many advantages. The combination of the shaft 336 with its annular recess 339 and the securing member 355 configured for engagement therewith enable the shaft assembly and shaft housing of the walker apparatus to be connected in a relatively strong and rigid manner. This reduces the chances of the shaft assembly dislodging from bore 322 and inhibiting motion and operation of the walker apparatus. This connection is further enhanced by the use and configuration of locknut 342 at end 341 of the shaft.

This strong connection in turn may allow for a mounting assembly that has relatively fewer parts, that is thus relatively more compact and that is also thus relatively easier and less expensive to manufacture and assemble.

Protective cap 356 so positioned between the shaft assembly and wheel and so shaped and disposed within the wheel fork, acts to inhibit dirt and debris from reaching the shaft assembly and various moving parts, causing the walker apparatus and mounting assembly to be even more durable.

The front fork cap 352 as herein described may provide yet a further advantage over walker apparatuses of the prior art. The cap 352, with its resilient spaced-apart projections 366 disposed in an annular arrangement, rotatably aligns and further supports pivoting of the wheel fork about the shaft in a relatively compact and cost-effective manner. Cap 352 as herein described renders a second bearing interposed between the wheel fork and shaft unnecessary.

Moreover, should the projections 366 eventually exhibit signs of fatigue and thus alone lose their springiness, spring 372 with its calculated elasticity provides the advantage of ensuring that resilience and bias remain, making the front fork rotate “true” to the rotational axis. Spring 372, in combination with the front fork cap so configured, also prevents rattling of the front fork on uneven grounds.

In brief, the walker apparatus with the mounting and front fork assemblies as herein described thus provides the combined advantages of increased reliability, reduced cost and increased safety.

Those skilled in the art will appreciate that many variations are possible within the scope of the inventive aspects of the walker apparatus. For example, instead of the folding mechanism 136, other means may be used for bringing together the frame members for folding the walker, as are known to those skilled in the art, for the non-folding inventive aspects of the walker apparatus.

For aspects of the invention other than the brake rod, those skilled in the art will appreciate that, instead of a brake rod, other means for engaging a brake pad mechanism may be used for the walker apparatus.

The handle bar assembly disclosed in the present invention is just by way of example. Those skilled in the art will appreciate that other means for engaging a brake pad mechanism may be used for the walker apparatus.

Those skilled in the art will appreciate that, instead of the brake pad mechanism 211, other brake pad means for braking at least one of the wheels may be used for the walker apparatus for its non-brake pad and non-brake housing inventive aspects. Likewise, other means 214 for connecting and adjusting the corresponding brake pad may be used for the walker apparatus for its non-brake pad and non-brake housing inventive aspects.

It will further be understood by a person skilled in the art that many of the details provided above are by way of example only and can be varied or deleted without departing from the scope of the invention as set out in the following claims.

What is claimed is:

1. A mounting assembly for fixedly mounting a pivotable wheel fork to a walker apparatus, the assembly comprising:

a frame portion of the walker apparatus, one of the wheel fork and the frame portion of the walker apparatus having both a first bore and a second bore, the second bore extending in a direction generally perpendicular to the first bore;

a shaft assembly rotatably connected to the other of the wheel fork and the frame portion of the walker apparatus and also being partially disposed within the first bore, the shaft assembly having a recess configured to align with the second bore; and a set screw threadably engageable with and at least partially disposed within the second bore, the set screw coupling to said one of the wheel fork and the frame portion of the walker apparatus and having a tapered end that engages with portions of the shaft assembly surrounding said recess, the shaft assembly being fixedly mounted to said one of the wheel fork and the frame portion of the walker apparatus thereby.

2. The mounting assembly as claimed in claim 1 wherein the recess is annular.

3. A walker apparatus having the mounting assembly as claimed in claim 1.

4. A mounting assembly for fixedly mounting a pivotable wheel fork to a walker apparatus, the assembly comprising:

a frame portion of the walker apparatus, one of the wheel fork and the frame portion of the walker apparatus having both a first bore and a second bore, the second bore extending in a direction generally perpendicular to the first bore;

a bolt rotatably connected to the other of the wheel fork and the frame portion of the walker apparatus and also being partially disposed within the first bore, the bolt having a recess configured to align with the second bore; and a securing member at least partially disposed within the second bore, the securing member coupling to said one of the wheel fork and the frame portion of the walker apparatus and engaging with portions of the bolt surrounding said recess, the bolt being fixedly mounted to said one of the wheel fork and the frame portion of the walker apparatus thereby.

5. The mounting assembly as claimed in claim 4 wherein the frame portion is said one of the wheel fork and the frame portion of the walker apparatus, the frame portion having an open first end facing the wheel fork, a closed second end opposite the first end, the first bore extending from the open first end towards the closed second end, and the frame portion having an exterior disposed between the open first end and the closed second end, the second bore being disposed between the open first end and the closed second end, the second bore extending from the exterior of the frame portion to the first bore.

6. The mounting assembly as claimed in claim 4, wherein the recess is annular.

7. The mounting assembly as claimed in claim 4 further including a bearing having an outer race coupled to the wheel fork and an inner race that abuts the bolt.

8. The mounting assembly as claimed in claim 7, wherein the frame portion is said one of the wheel fork and the frame portion of the walker apparatus, wherein the bolt is threadably engageable with the first bore, and wherein the bolt has a head positioned to operatively abut the inner race of the bearing.

9. The mounting assembly as claimed in claim 4 wherein the frame portion is said one of the wheel fork and the frame portion of the walker apparatus and wherein the securing member is a split tube press fitted to portions of the frame portion surrounding the second bore so as to engage with the recess of the bolt, the bolt being fixedly mounted to the frame portion thereby.

10. A walker apparatus having the mounting assembly as claimed in claim 4.

11. A mounting assembly for mounting a wheel fork to a frame portion of a walker apparatus, the wheel fork having a bore, and the assembly comprising:

a shaft assembly coupled to the frame portion and at least partially disposed within the bore of the wheel fork; and an alignment member at least partially disposed within the bore of the wheel fork, the alignment member having a first portion shaped to extend around the shaft assembly and a resilient second portion configured to abut against portions of the wheel fork surrounding the bore, the alignment member thereby rotatably aligning and supporting pivoting of the wheel fork about the shaft.

12. The mounting assembly as claimed in claim 11, further including a resilient member disposed within the bore of the wheel fork and disposed adjacent to the second portion of the alignment member, the resilient member being configured to bias the second portion of the alignment member against the wheel fork.

13. The mounting assembly as claimed in claim 12 wherein the resilient member is an annular wire spring.

14. The mounting assembly as claimed in claim 12 wherein the alignment member includes a radially outwardly-extending top that couples the first portion and the second portion of the alignment member together.

15. The mounting assembly as claimed in claim in claim 14, wherein the alignment member includes a peripheral, rim portion that radially extends outwards and downwards from the top thereof, the rim portion being configured to fit over top of and abut with a top end of the wheel fork.

16. The mounting assembly as claimed in claim 12 wherein the apparatus further includes a spring lock ring configured to extend around and abut with the first portion of the alignment member, the spring lock ring biasing the resilient member towards the top of the alignment member.

17. The mounting assembly as claimed in claim 11 wherein the second portion of the alignment member includes a plurality of spaced-apart resilient projections.

18. The mounting assembly as claimed in claim 11 further including a bearing that rotatably connects the shaft assembly to the wheel fork.

19. The mounting assembly as claimed in claim 18 wherein the alignment member abuts the bearing.

20. A walker apparatus having the mounting assembly as claimed in claim 11.

* * * * *

UNITED STATES PATENT AND TRADEMARK OFFICE

CERTIFICATE OF CORRECTION

PATENT NO. : 8,864,151 B1
APPLICATION NO. : 13/893043
DATED : October 21, 2014
INVENTOR(S) : Julian Liu It is certified that error appears in the above-identified patent and that said Letters Patent is hereby corrected as shown below:

In the Claims

Col. 18, lines 11-19, should read,

14. The mounting assembly as claimed in claim 11 wherein the alignment member includes a radially outwardly-extending top that couples the first portion and the second portion of the alignment member together.

15. The mounting assembly as claimed in claim 14, wherein the alignment member includes a peripheral, rim portion that radially extends outwards and downwards from the top thereof, the rim portion being configured to fit over top of and abut with a top end of the wheel fork.

Signed and Sealed this
Sixth Day of January, 2015

Michelle K. Lee
*Deputy Director of the United States Patent and Trademark Office*